(12) United States Patent
Miyata

(10) Patent No.: US 6,259,249 B1
(45) Date of Patent: Jul. 10, 2001

(54) INDUCTION-TYPE POSITION MEASURING APPARATUS

(75) Inventor: Toshiharu Miyata, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/197,419

(22) Filed: Nov. 23, 1998

(30) Foreign Application Priority Data

Dec. 3, 1997 (JP) .................................................. 9-333249
May 25, 1998 (JP) ................................................ 10-143537

(51) Int. Cl.[7] .............................. G01B 7/14; G01B 7/30; G01D 5/20
(52) U.S. Cl. ............................... 324/207.17; 324/207.12; 324/207.24; 324/207.25; 336/45; 340/870.32
(58) Field of Search .......................... 324/207.17–207.19, 324/207.24, 207.25, 207.26; 336/45, 75, 77, 79, 115, 129; 340/870.32, 870.34–870.36; 341/115; 318/653

(56) References Cited

U.S. PATENT DOCUMENTS

| | | | |
|---|---|---|---|
| 3,439,256 | * 4/1969 | Kähne | 324/207.17 X |
| 4,401,986 | * 8/1983 | Trenkler et al. | 324/207.17 X |
| 4,584,577 | * 4/1986 | Temple | 324/207.17 X |
| 4,638,250 | * 1/1987 | Shen-Orr et al. | 324/207.17 |
| 5,804,963 | * 9/1998 | Meyer | 324/207.17 |
| 5,841,274 | 11/1998 | Masreliez et al. | 324/207 |
| 5,886,519 | 3/1999 | Masreliez et al. | 324/207 |
| 5,894,678 | 4/1999 | Masreliez et al. | 33/762 |
| 5,901,458 | * 5/1999 | Andermo et al. | 324/207.24 X |
| 5,936,399 | 8/1999 | Andermo et al. | 324/207 |
| 5,973,494 | 10/1999 | Masreliez et al. | 324/207.24 |
| 5,998,990 | 12/1999 | Andermo et al. | 324/207.12 |
| 6,002,250 | 12/1999 | Masreliez et al. | 324/207.16 |
| 6,005,387 | 12/1999 | Andermo et al. | 324/207.17 |
| 6,011,389 | 1/2000 | Masreliez et al. | 324/207.17 |
| 6,049,204 | 4/2000 | Andermo et al. | 324/207.17 |
| 6,054,851 | 4/2000 | Masreliez et al. | 324/207.17 |
| 6,157,188 | 12/2000 | Steinke | 324/207.17 |

* cited by examiner

Primary Examiner—Gerard R. Strecker
(74) Attorney, Agent, or Firm—Oliff & Berridge, PLC

(57) ABSTRACT

An inductive linear encoder (10) has a position sensor (1) and scale (2) which are movably disposed relative to each other. The sensor (1) is with a drive wire (3) to which an alternating current is supplied, and one set of detection wires (4a–4d) at right angles to the drive wire (3) in the same plane. The scale (2) is configured including an elongate substrate (7) having its surface on which a series combination of conductive closed loop patterns (8) are periodically arranged at equal intervals. These conductive closed loop (8) are linearly laid out on the substrate (7) in the relative movement direction. Each loop (8) consists essentially of a reception conductor segment (8a) and signal transmit conductor segments (8b, 8c) integral with the former (8a). The receive conductor segment (8a) is responsible for generation of an induced current due to a first variable magnetic field creatable from the drive coil (3). The transmit conductor segments (8b, 8c) are to create second variable magnetic fields that are opposite in polarity to each other and are perpendicular to the first magnetic field. Creation of such second magnetic fields results in flow of an induced current in the detector wire (4) of sensor (1), which in turn acts as a position detection output current.

13 Claims, 15 Drawing Sheets

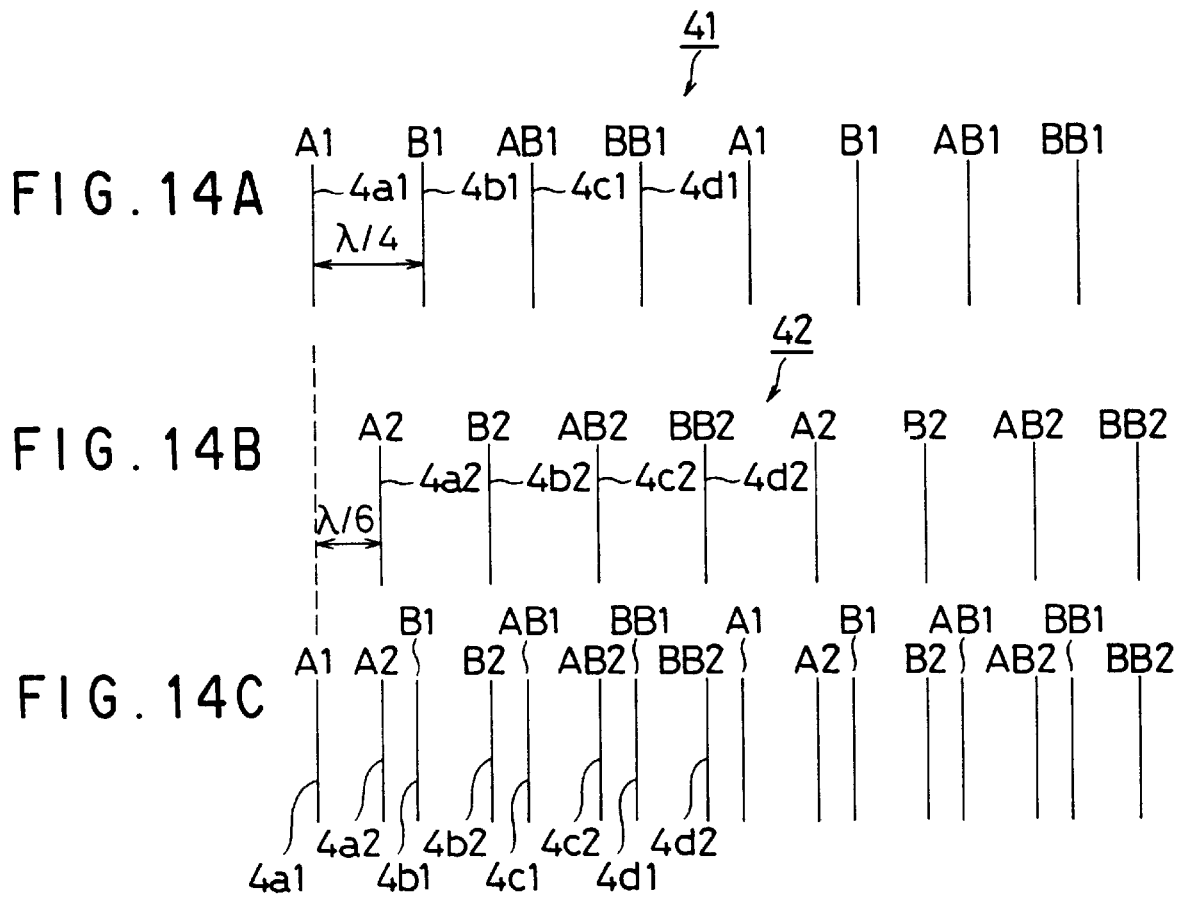
FIG. 14A
FIG. 14B
FIG. 14C
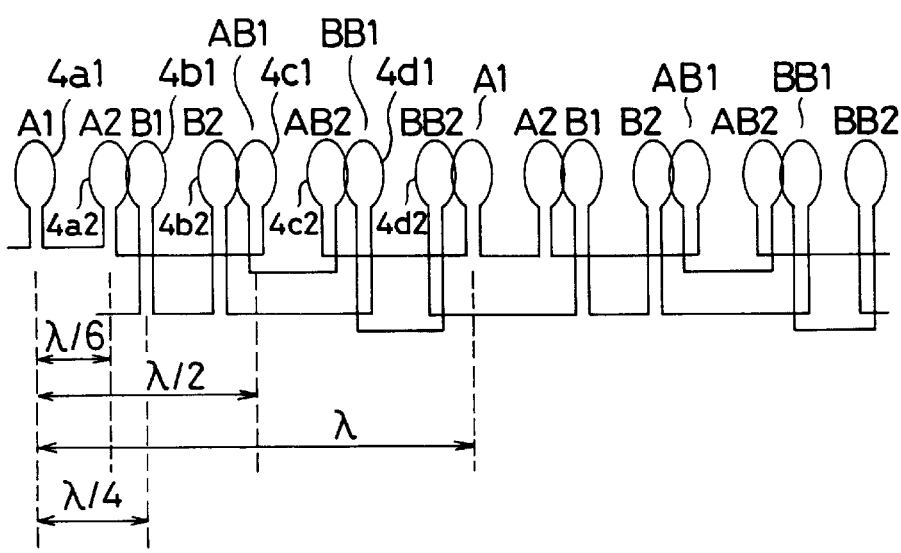
FIG. 15

FIG. 18
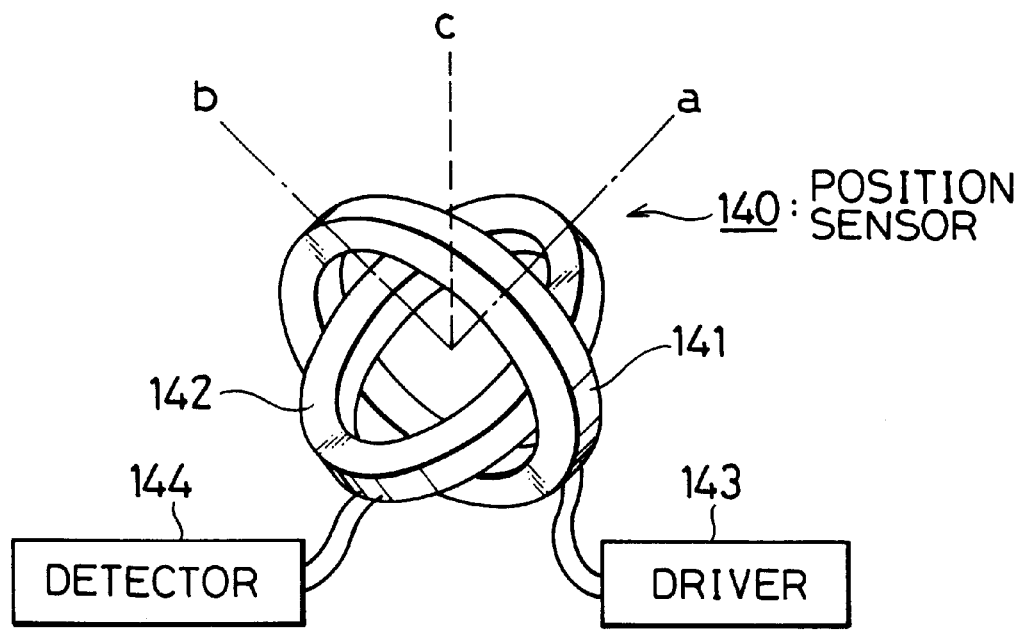
FIG. 19A     FIG. 19B
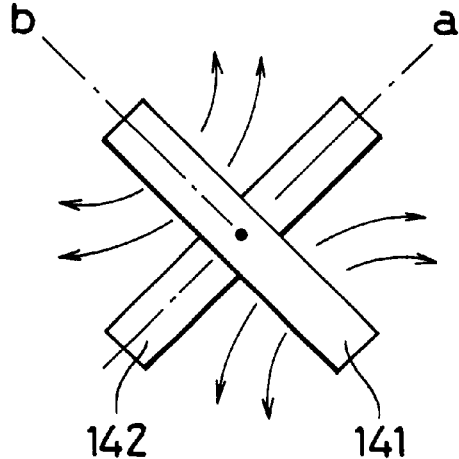 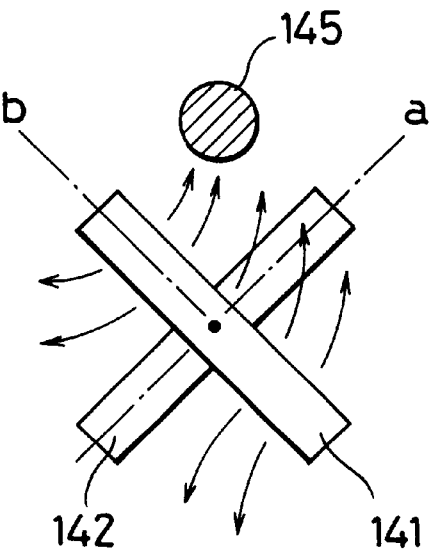

INDUCTION-TYPE POSITION MEASURING APPARATUS

BACKGROUND OF THE INVENTION

1. Field of the Invention

The present invention relates to an induction-type position measuring apparatus for performing position measurements based on electromagnetic coupling principles.

2. Description of the Related Art

One prior known magnetic encoder employing transformers is configured including a displacement sensor and a scale structure operatively associated therewith. The displacement sensor typically has two coils: a primary coil (i.e. drive coil), and a secondary coil (detection coil). The scale is placed adjacent to the sensor and is movable relative thereto. The scale is responsible during movement for modulating the magnetic flux as generated from the drive coil. Upon activation of the drive coil by supplying an alternating drive current thereto, variable magnetic flux might take place, which is then modulated by the scale resuting in coupling with the detection coil. This magnetic coupling causes induction of a corresponding voltage at the detector coil. The induced voltage is variable in potential with movement of the scale, and thus is employable as a detection output indicative of a position measured.

With the prior art magnetic encoder thus arranged, the drive coil and its associative detector coil are coaxially disposed. Such coaxial coil layout must permit presence of electromagnetic coupling components (cross-talk) between the spaced-apart drive coil and detector coil, which components remain independent of the relative position of the scale and are hardly affected from it. Presence of such crosstalk results in inclusion of certain offset components in a detection output of the detector coil, which again are hardly affectable by relative movements of the scale. These offset components can badly behave to cause significant measurement errors in cases where high-precision position detection is performed by dividing a wavelength of the scale into portions.

One typical approach to removal of such offset components is to differentiate two detection voltages of which phases are reverse with each other. This approach, however, suffers from difficulty in offset removal due to the fact that offset components are significantly affectable from the alignment accuracy of the drive and detector coils along with uniformity of materials employed therefor, resulting in the offset value experiencing non-negligible amount of variations among individual products.

SUMMARY OF THE INVENTION

It is an object of the invention to provide such an inductive position measurement apparatus capable of effecting high-accuracy position measurements that offset components are not generated in principle.

In accordance with one aspect of the instant invention, an induction-type position measurement apparatus comprises a first member; a second member having a measurement axis and being movably arranged along the measurement axis with a predefined gap between the first and second members; a drive wire disposed on the first member and having a predetermined length along the measurement axis, for producing a first variable magnetic field upon receipt of an alternating current from a drive signal source; an array of electromagnetic coupling devices laid out on the second member along the measurement axis at constant intervals, each of the electromagnetic coupling devices generating an induced current due to couplement with the first variable magnetic field generated by the drive wire, and generating a second variable magnetic field substantially perpendicular to the first variable magnetic field in response to the induced current at a position physically spaced apart from a coupling portion with the first variable magnetic field; and a variable magnetic field detecting device which has at least one detection wire disposed on the first member substantially perpendicular to the drive wire, for providing an output signal due to couplement with the second variable magnetic field from the electromagnetic coupling devices, the output signal being variable with relative displacement of the first and second members.

A respective one of the electromagnetic coupling devices may typically be configurable from a conductive member providing therein a closed loop current flow path. This closed loop conductor has a receiver conductor segment and more than one transmitter conductor segment The receiver conductor segment lies substantially parallel to the drive wire, and is coupled with the first variable magnetic field as produced by the drive wire. The transmit conductor segment is formed continuously with the receiver conductor segment, for creation of the second variable magnetic field. More practically, each loop conductor is structured including two transit conductor segments which are spaced apart from each other by a distance that is equivalent to half of the layout period or "pitch" of the electromagnetic couplers. These segments are at right angles to the drive wire in a plane, and may derive electromagnetically induced current components flowing therethrough in opposite directions perpendicular to the drive wire.

The variable magnetic field detector device may be such that it includes at least one set of four detection wires lying parallel to one another. These parallel detector wires are laid out within a coverage corresponding to the length of the drive wire at predefined intervals each equal to quarter of the layout period of the electromagnetic couplers. Upon coupling with one or more variable magnetic fields generatable from the transmit conductor segments of each loop conductor, the detector wires provide four-phase output signals, each of which is offset by 90° from another.

In accordance with another aspect of the invention, there is provided an induction-type position measurement apparatus with an inductive position sensor for use in measuring a present location of an object of interest under measurement. The inductive position sensor comprises a drive coil for generating a variable magnetic field upon receipt of an alternating current from a drive current source; a detection coil disposed adjacent to the drive coil for generating an induced current due to coupling with a variable magnetic field created by the drive coil in response to displacement of the object; and a support body for immovably holding the drive coil and the detection coil, wherein the drive coil and said detection coil are arranged so that in absence of the object no electromagnetic coupling is made, while electromagnetic coupling with the detection coil occur due to modulation in distribution of the variable magnetic field as generated by the drive coil depending upon displacement of the object.

In the former position measurement apparatus of the induction type in accordance with the first aspect of the invention, the drive wire and detection wire are disposed at right angles to each other on the first member so that any variable magnetic fields generatable due to alternating current flow in the drive coil will no longer be directly coupled with the detector wire. A first vaiable magnetic field generated by AC-driving the drive wire causes the electromagnetic coupler devices on the second member to produce an induced current. Each electromagnetic coupler is typically configurable from a conductive closed loop pattern having a receive conductor segment lying parallel to the drive wire and more than one transmit conductor segment extending perpendicular thereto. An induced current generatable in the receive conductor segment attempts to flow in this conductive loop producing a second variable magnetic field at right angles to the first variable magnetic field at a specific location physically distant from the receive conductor segments. Detecting this second magnetic field by the detector wire makes it possible to obtain a detection output changeable depending on relative displacement between the fist and second members.

With the scheme of this invention, no electromagnetic coupling activities take place in principle between the drive and detector wires due to the fact that these wires are disposed at right angles to each other. Thus, no offset components are generatable unlike prior art systems. This may in turn enable achievement of high-precision position measurements required.

In the induction-type position measurement apparatus in accordance with the second aspect of the invention, the position sensor's drive coil and detector coil are disposed so that these are in the state that no electromagnetic coupling is present in the absence of any object of interest to be measured at right angles to each other, while permitting creation of electromagnetic coupling with the detector coil due to modulation of the drive coil's generated variable magnetic field distribution in response to the object's displacement. Accordingly, with this apparatus also, it becomes possible to obtain offset-free detection outputs, leading to an ability to attain high-precision position measurements.

These and other objects, features and advantages of the invention will be apparent from the following more particular description of preferred embodiments of the invention, as illustrated in the accompanying drawings.

BRIEF DESCRIPTION OF THE DRAWINGS

FIGS. 14A–14C are illustrations each for explanation of a configuration of a sensor also embodying this invention.

FIG. 15 depicts an exemplary configuration of the embodiment sensor.

FIG. 18 shows a principal structure of an induction-type position sensor in accordance with a further embodiment of the invention.

FIGS. 19A–19B are diagrams for explanation of the operation principle of the position sensor of FIG. 18.

DETAILED DESCRIPTION OF THE PREFERRED EMBODIMENTS

Figure 1:
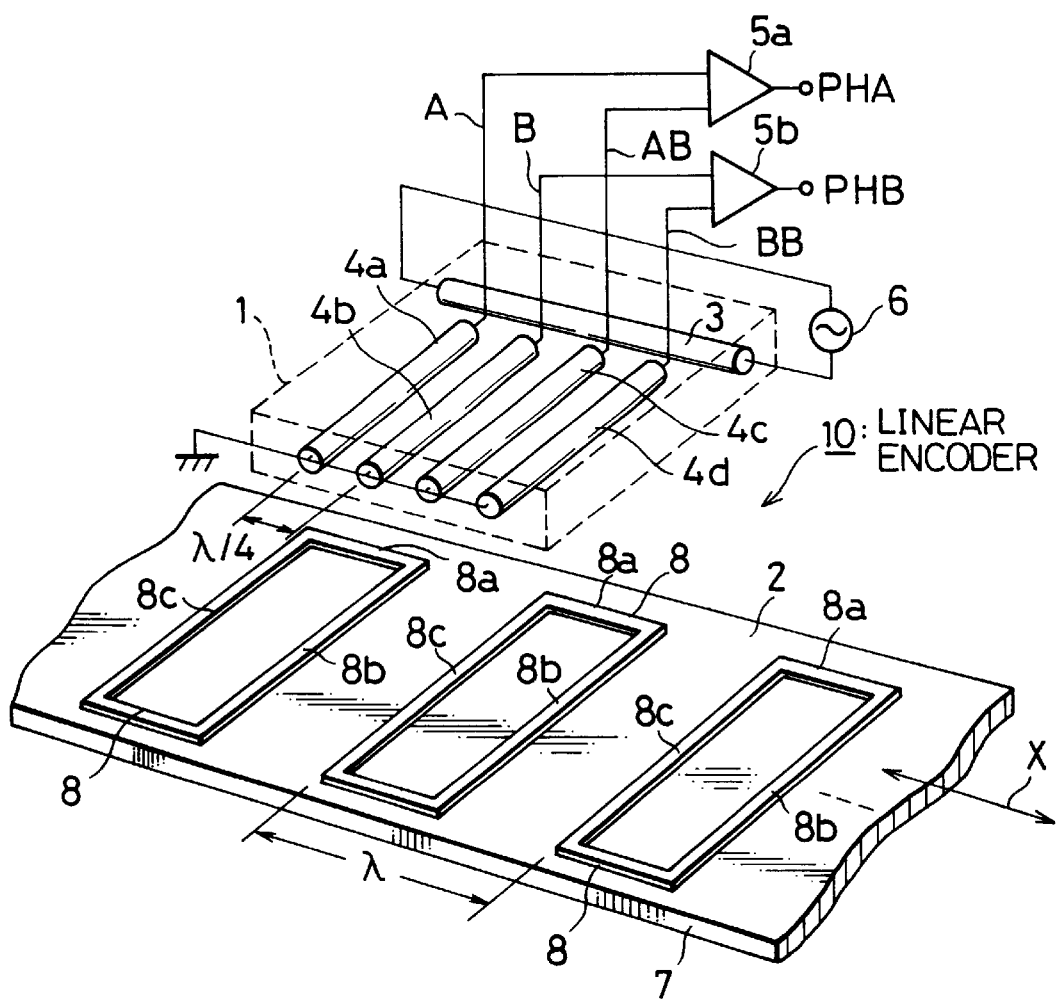
FIG. 1 is a diagram showing a principal configuration of a linear encoder in accordance with one preferred embodiment of this invention.

Referring now to FIG. 1, there is illustrated in perspective view a principal configuration of an electromagnetic linear encoder 10 in accordance with one embodiment incorporating the first principle of the invention. As shown herein, the encoder 10 includes in combination a sensor 1 (as a first member), and a scale 2 (as a second member). The sensor 1 and scale 2 are disposed opposing each other with a predetermined distance or gap defined between them. The scale 2 is relatively movable reciprocally along a preset measurement axis X, which is set in the longitudinal direction of the scale 2. The sensor 1 includes a drive wire 3 having a preselected length, which extends in the measurement axis X. The sensor 1 also includes parallel spaced-apart detection wires 4 that lie perpendicular to the drive wire 3 in the same plane. These wires act as detection wires, and are illustratively formed from four wires 4a–4d as one unitary group or set. The layout interval or pitch between adjacent ones of such detection wires 4 is designed to be quarter of the scale pitch λ (i.e., λ/4) as will be later discussed in the description. The length of drive wires 3 is such that it is at least equal to the scale pitch λ when four ones 4a–4d of the detection wires 4 are grouped into one set. The drive wire 3 is connected to a drive signal source 6, which is operable to drive the wire 3 causing an alternating current to flow in wire 3. Alternate ones of detector wires 4 are coupled to two-input differential amplifiers 5a, 5b in a way such that alternate wires 4a, 4c are coupled to the inverting and non-inverting inputs of amplifier 5a, whereas the remaining alternate wires 4b, 4d are to the inputs of amplifier 5b as shown in FIG. 1.

The scale 2 is structured from an electrically insulative or dielectric elongate substrate 7, and a preselected number of closed conductive loops 8 each being patterned providing a closed-loop current flow path therein. These conductive loops 8 are laid out in a linear array on the top surface of the scale substrate 7 with a specified scale pitch $\lambda$ along the measurement axis X. Each loop conductor 8 functions as an electromagnetic coupler device, which derives an induced current generated by a variable magnetic field—say, "first" variable magnetic field—creatable upon AC-driving of the drive wire 3, for creation of another variable magnetic field ("second" variable magnetic field) perpendicular to the first variable magnetic field at locations apart from the position immediately beneath drive wire 3. Each loop conductor 8 is illustratively patterned into a rectangular frame shape. One short side portion 8a immediately underlying the drive wire 3 in almost parallel thereto serves as a signal receiver conductor segment, which provides an induced current when coupled with the first variable magnetic field generatable from driver wire 3. The opposite long sides 8b, 8c extending at right angles to such receive conductor segment 8a are disposed lying parallel to segment 8a thereby to make up signal transmitter conductor segments for use in producing, upon receipt of the induced current, the second variable magnetic field as coupled with detector wires 4. The transmitter conductor segments 8b, 8c of each loop 8 are spaced apart from each other at a distance of $\lambda/2$.

Figure 2A:
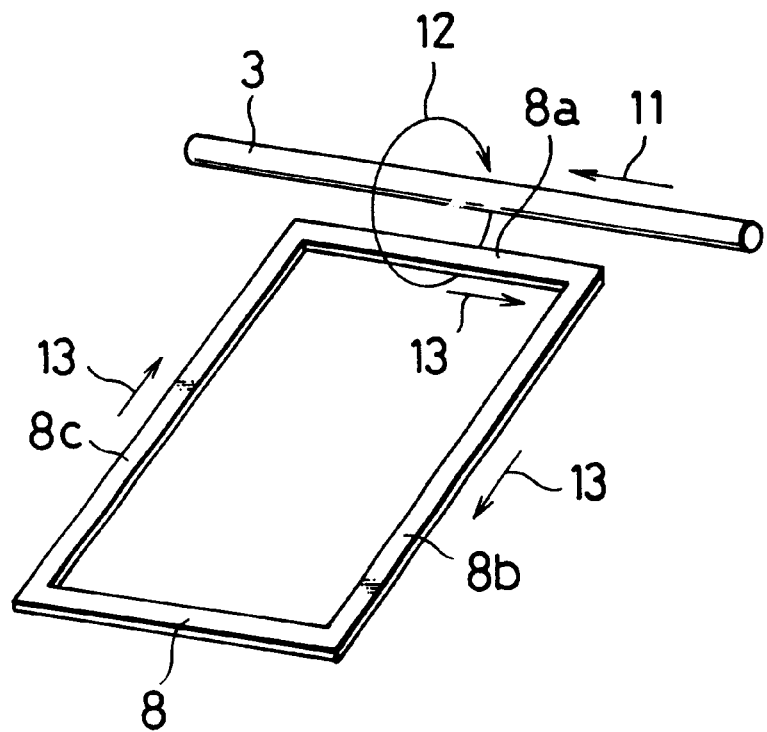
FIG. 2A is a diagram showing a perspective view of a combination of magnetically coupled drive wire and conductive closed loop pattern as used in the linear encoder shown in FIG. 1.
Figure 2B:
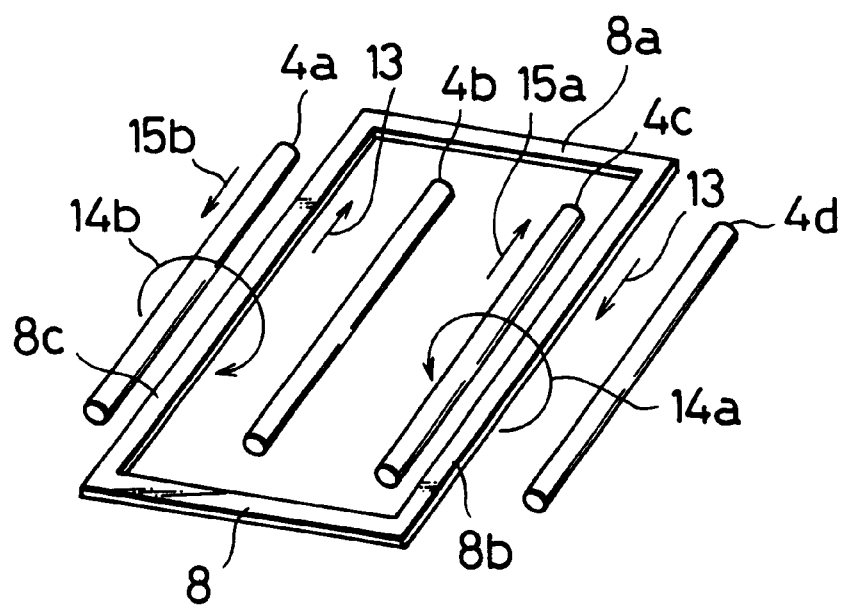
FIG. 2B depicts a perspective view of the conductive loop and its associated detection wires for explanation of the electromagnetic coupling therebetween.

A position measurement operation of the linear encoder 10 thus arranged will be explained with reference to FIG. 2A–2B. FIG. 2A illustrates in perspective view one state of electromagnetic coupling between the drive wire 3 on sensor 1 and one of the conductive loop patterns 8 on scale 2, while FIG. 2B depicts the state of electromagnetic coupling between the loop conductor 8 and its associated detector wires 4a–4d. As shown in FIG. 2A, when letting an AC drive current flow 11 in drive wire 3, a first variable magnetic field 12 is created around wire 3. One loop conductor 8 adjacent to this wire 3 becomes coupled at its signal receipt conductor segment 8a with the first variable magnetic field 12, producing therein an induced currents 13. This current 13 attempts to flow circularly in loop 8 along its closed-loop path. The induced current 13 flows in two transmit conductor segments 8b, 8c of loop 8 extending at right angles to the receipt conductor segment 8a, providing current components flowing in the opposite directions, which create second variable magnetic fields 14a, 14b perpendicular to the first magnetic field 12 around segments 8b, 8c respectively as shown in FIG. 2B.

A distance between the first and third ones 4a, 4c of four detection wires 4 on the sensor 1 is equal to the distance between two transmit conductor segments 8b, 8c in one loop conductor 8, which should measure $\lambda/2$. As shown in FIG. 2B, supposing that these wires 4a, 4c are immediately over transmit conductors 8c, 8b, the second variable magnetic fields 14a, 14b created around such two transmit conductors 8b, 8c are electromagnetically coupled strongly with detection wires 4c, 4a respectively to derive induced currents 15a, 15b that flow in wires 4c, 4a in the opposite directions. As the scale 2 moves, the electromagnetic coupling between detector wires 4 and loop conductor 8 varies in magnitude. Thus, the resulting induced currents 15a, 15b in detector wires 4c, 4a vary substantially sinusoidally in magnitude along the opposite directions with motion of scale 2. This will be true for the second and fourth ones 4b, 4d of the detector wires 4: these wires 4b, 4d will exhibit, with a constant phase difference, an induced-current variation in reply to scale 2's motion in a way similar to that in the wires 4a, 4c.

With such scale motion-dependent electromagnetic coupling variation at each part, one set of four detection wires 4a–4d provide four-phase output currents A, AB, B, BB each of which is shifted in phase by 90° degrees from its neighboring one. Accordingly, by connecting the detector wires 4 to the differential amplifiers 5a, 5b in a way such that a pair of wires 4a, 4c which are exactly out of phase with each other are coupled to one amplifier 5a whereas the other pair of wires 4b, 4d being exactly out of phase with each other are to the remaining amplifier 5b as shown in FIG. 1, and then applying differential processing thereto, it becomes possible to obtain signal voltages PHA, PHB which are phase-shifted by 90° from each other.

Figure 3:
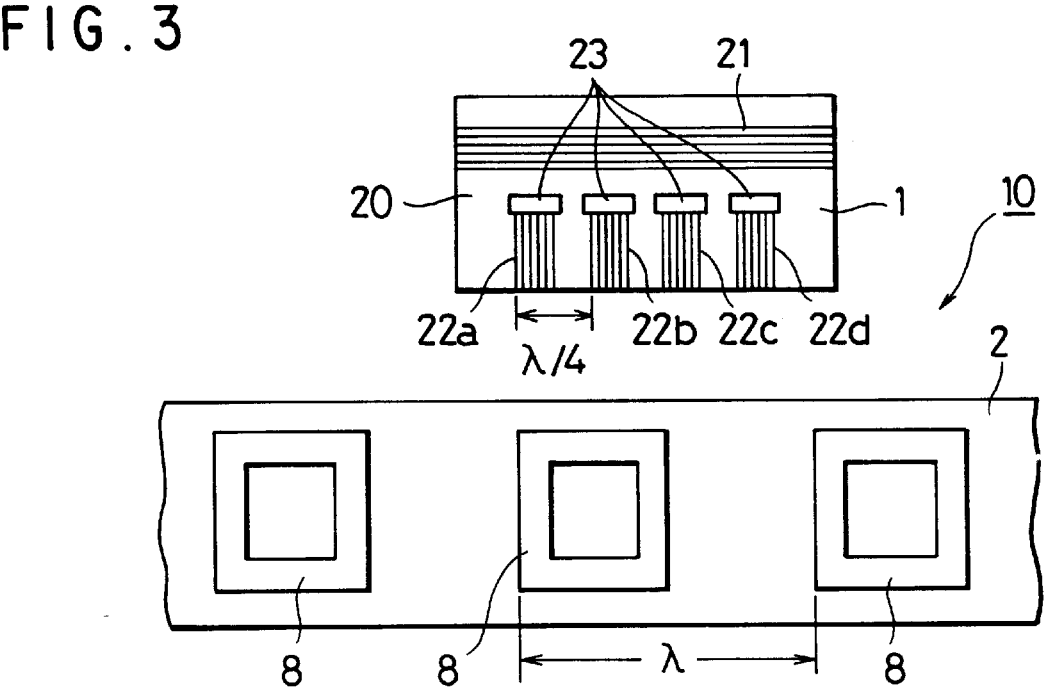
FIG. 3 depicts a plan view of a prototype linear encoder including a sensor and a scale structure.
Figure 4A:
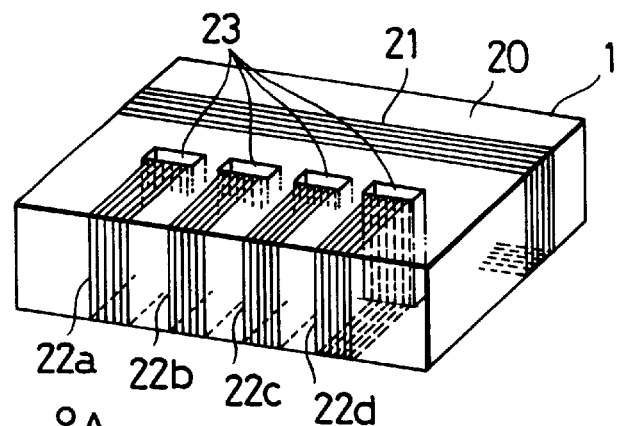
FIG. 4A shows a perspective view of the sensor used in the encoder of FIG. 3.
Figure 4B:
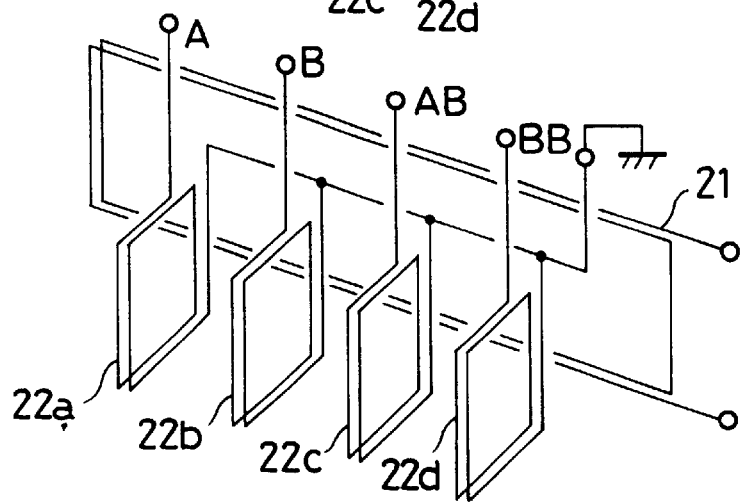
FIG. 4B is a diagrammatic representation of a configuration of equivalent circuitry of the sensor.

Referring to FIG. 3, there is illustrated in plan view one practical configuration of the sensor 1 and scale 2 used in the embodiment linear encoder 10 shown in FIG. 1. FIG. 4A depicts in perspective view the structure of sensor 1, whose equivalent circuity is visible in FIG. 4B. The sensor 1 shown includes a dielectric block 20 made of a chosen resin material with a drive coil 21 being wound around it in a direction parallel to the longitudinal direction of scale 2, and also with detector coils 22 wound in the perpendicular direction thereto. As better depicted in FIG. 4A, the resin block 20 has vertical through-going holes 23 preformed therein at locations distant from the drive coil 21, which holes are for winding of detector coils 22 perpendicular to drive coil 21. Electrical leads are wound through such holes 23 providing independent rectangular detector coils 22a–22, respectively. A respective one of drive coil 21 and detector coils 22a–22d has a predefined number of parallel spaced-apart wire portions at equal intervals on the bottom surface of resin block 20, which may correspond respectively to the drive wire 3 and detector wires 4 shown in FIG. 1.

The scale 2 is formed from a printed circuit board that has a metallic thin-film layer as patterned forming an array of the loop conductors 8. Optionally, the scale 2 may be arranged using a glass substrate, ceramic substrate or the like other than the print board, each having on its surface a conductive film patterned through etching treatment into a similar array of loop conductors.

Figure 5:
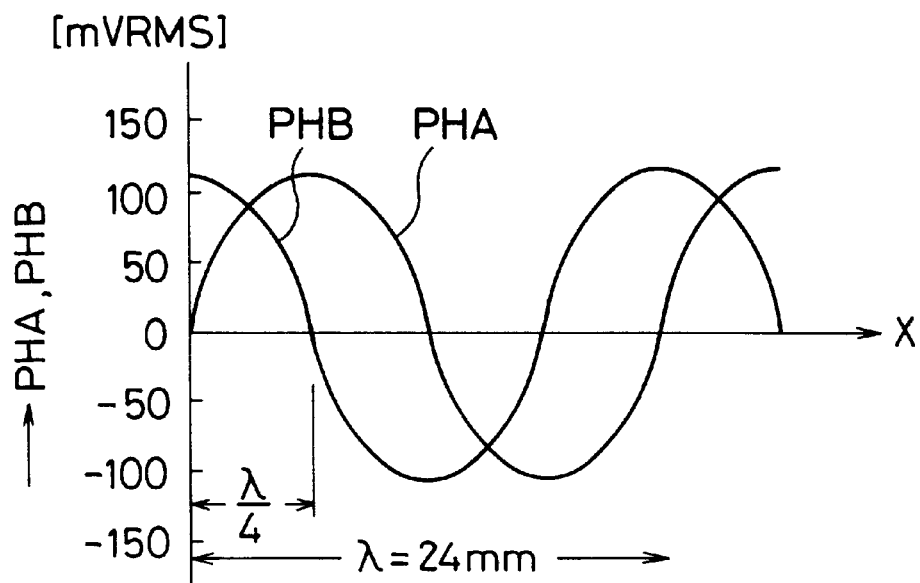
FIG. 5 is a graph showing a detection output signal waveform of the encoder shown in FIGS. 3–4B.

A prototype encoder structure was prepared letting the scale pitch $\lambda$=24 [mm] and the gap between the sensor 1 and scale 2 be 2 [mm] with a drive signal source voltage set at 12 [v] having a frequency of 1 [MHz]. The encoder includes differential amplifiers corresponding to those 5a, 5b of FIG. 1, which are each designed to provide at its output a signal voltage PHA, PHB through twenty-time amplification of a voltage indicative of a difference between corresponding detection outputs from detector wires (4a, 4c; 4b, 4d) that are exactly out of phase with each other. The resultant signal voltage waveforms are shown in FIG. 5. The signal voltages PHA and PHB are plotted as effective net voltages in the unit of "mVRMS." As apparent from FIG. 5, its has been affirmed that a signal offset is as small as 0.6[%] of the signal amplitude, or stays below.

Figure 6:
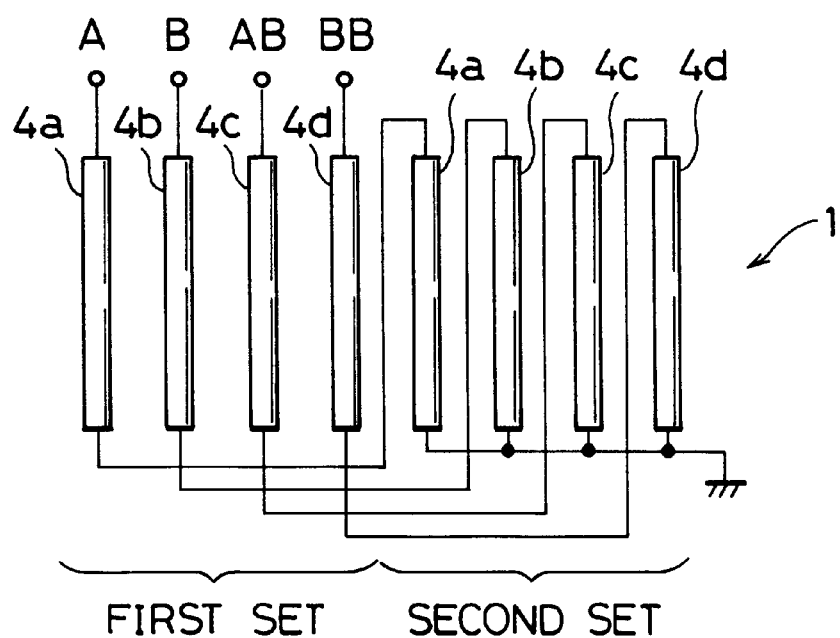
FIG. 6 illustrates another exemplary configuration of the sensor.

While in the foregoing explanation the detector wires 4 are arranged with four wires grouped into one set for purposes of convenience in illustration and discussion herein, it will be preferable that a greater number of detector wire sets be provided with similar phase relationship maintained. See FIG. 6, which shows one example wherein the sensor 1 includes two sets of such detector wires. More specifically, a first set consists of four parallel detector wires 4a–4d, and a second set consists of four ones 4a–4d. Those "same-phase" wires in respective sets which are exactly in phase with each other are serially connected together in a manner which follows. The wire 4a in the first set is series-connected to its corresponding one 4a in second set The second wire 4b in first set is series-coupled to wire 4b in second set. The third wire 4c in the former set is to wire 4c in the latter; the last wire 4d in first set is to wire 4d in second set. The four wires 4a–4d of second set have their ends common-coupled to ground. The wires 4a–4d of first set have opposite ends as detection output terminals for A, AB, B and BB phase outputs. It would be readily appreciated by those skilled in the art that with such plural detector wire sets used for the sensor 1, the drive wire associated therewith should be elongated to have an extended length covering the widened region of such detector wires increased in number.

Providing multiple sets of detector wires in the way stated above may permit further enhancement of the position measurement accuracy due to the averaging effect expected.

Figure 7:
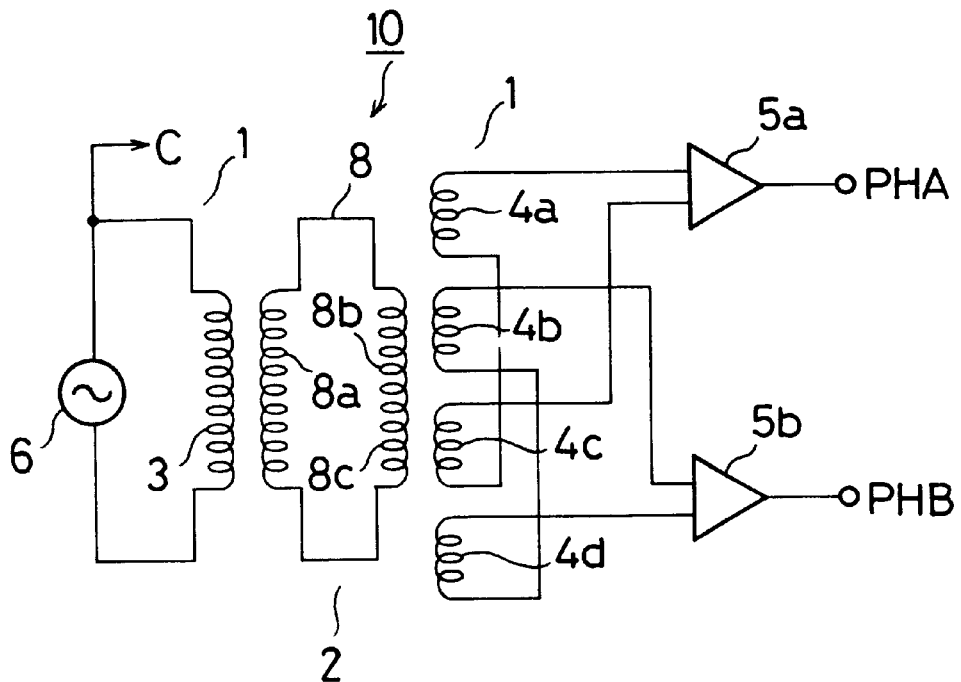
FIG. 7 depicts equivalent circuitry of a linear encoder embodying the invention.

Turning now to FIG. 7, there is illustrated electrical equivalent circuity of a linear encoder 10 of this embodiment. As shown herein, the drive wire 3 on the sensor 1 and the receive conductor segment 8a of loop conductor 8 on the scale 2 make up a transformer thereby permitting flow of an induced current in loop conductor 8. Another transformer is configured between the transmit conductor segment 8b, 8c of loop 8 on the scale 2 and the detector wire 4 on the sensor 1 with the aforementioned specific phase relationship established, thereby causing a variable magnetic field created by the induced current from receive conductor 8a to couple the detector coil 4.

Figure 8:
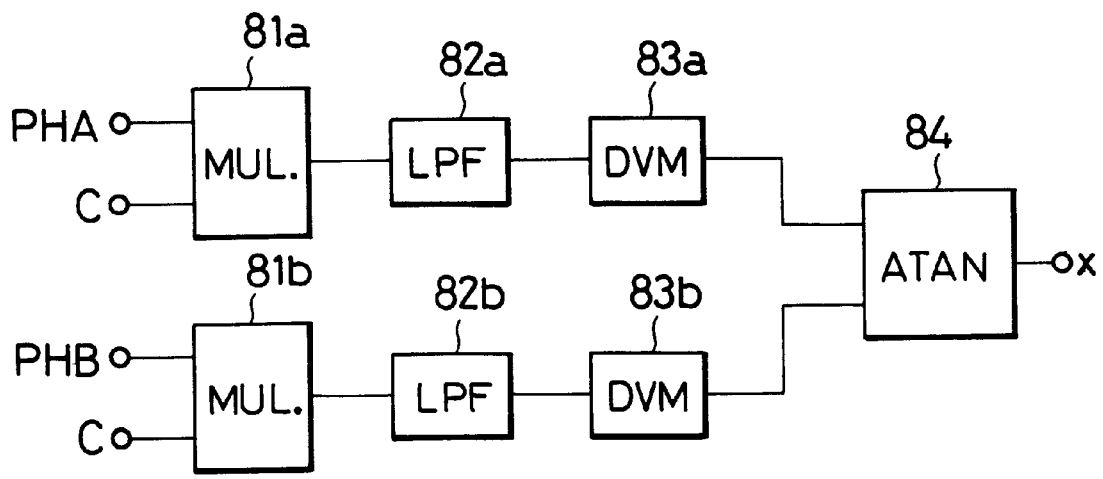
FIG. 8 is a block diagram of a signal processor circuit adaptable for use in the embodiment linear encoder.

See also FIG. 8, which depicts a configuration of signal processing circuitry for use in determining displacement. Letting a voltage of the drive signal source 6 be defined as C=sin(ωt), two resultant detection signal voltages PHA, PHB may be given as: PHA=sin(kx)·sin(ωt), PHB=cos(kx)·sin(ωt). Here, the amplitude is set at 1 for purposes of convenience in explanation only. The signal voltage PHA and A.C. drive voltage "C" are supplied to a multiplier circuit 81a which multiplies them together; the voltage PHB and AC drive voltage C are passed to another multiplier 81b for multiplication. Output signals of multipliers 81a, 81b are then fed to low-pass filter (LPF) circuits 82a, 82b respectively, for removal of any high frequency components contained therein. Whereby, sinusoidal wave components sin(kx) of displacement x may be extracted along with its cosine wave components cos(kx). These components are then input to digital volt meters (DVMs) 83a, 83b for detection of corresponding voltage amplitude values. The resulting amplitudes are routed to an arithmetic processor circuit 84, which executes arc tangent (ATAN) function processing to thereby numerically determine the value of displacement x.

Figure 9:
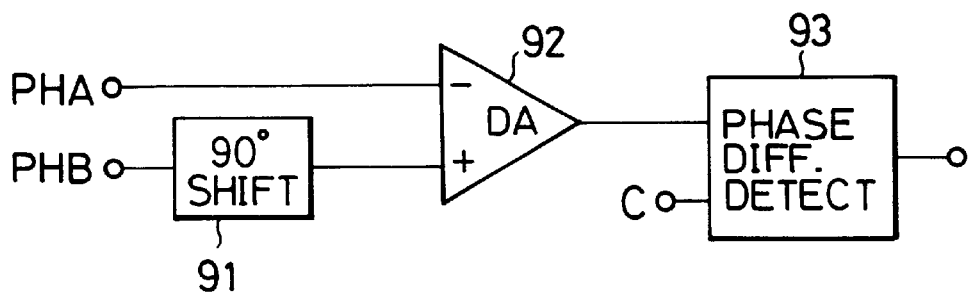
FIG. 9 is a block diagram of another signal processor circuit usable in the linear encoder.

See FIG. 9. This diagram shows one exemplary configuration of another signal processor circuitry for use in obtaining the displacement x. This circuitry shown is composed of a phase-shift circuit 91, a differential amplifier 92, and a phase-difference measurement/detection circuit 93. Upon receipt of two detection signal voltages PHA and PHB, one of them, PHB is supplied via the phase-shifter 91, for effectuation of 90° phase shifting, to the inverting input of differential amplifier 92 while letting the remaining voltage PHA be input directly to the non-inverting input of amplifier 92. Whereby, the differential amplifier 92 provides at its output a signal indicative of the value of cos(kx+ωt). The differential amplifier 92's output is passed to a first input of the phase-difference detector 93. This detector has a second input to which a reference signal is fed which is potentially representative of a predefined voltage level, i.e. the AC drive voltage C=sin(ωt). Based on such input signals, phase-difference detector 93 operates to detect a difference in phase between them obtaining a displacement x component required.

Figure 10:
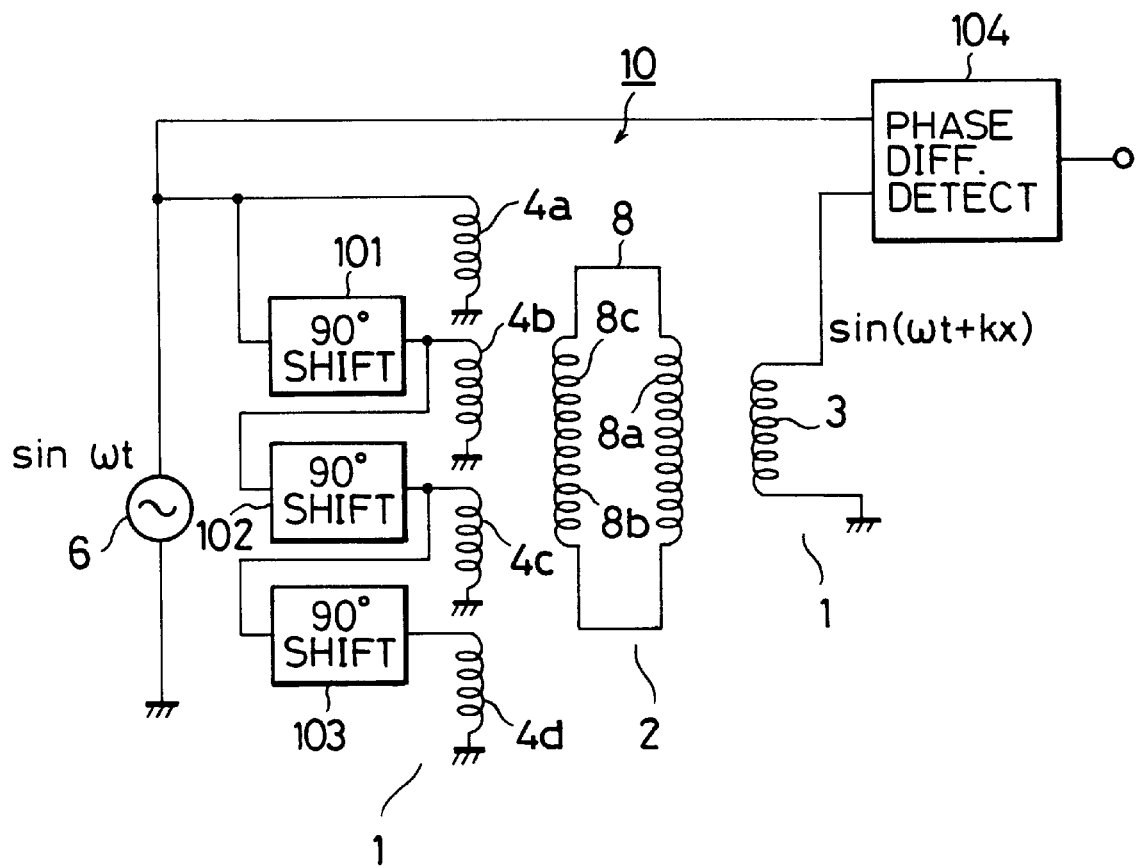
FIG. 10 depicts a configuration of equivalent circuitry of an embodiment linear encoder with its transmit and receive stages reversed.

Note that in the above embodiment, the drive wire 3 and detector wire 4 of the linear encoder 10 are reversible in relation. More specifically, where appropriate, the encoder will be modified so that while AC-driving the detector wire 4, the drive wire 3 is alternatively used as a detector wire providing the inverse electromagnetic coupling opposite in direction to the case stated supra; in this case also, similar position measurements may be achievable. Equivalent circuitry in this case is shown in FIG. 10. The loop conductor 8 on the scale 2 is such that its receive conductor segment 8a functions as the transmit conductor, whereas two transmit conductor segments 8b, 8c serve as the receive conductors. An AC signal from drive signal source 6 is supplied so that it progressively passes through 90° phase shifters 101–103 in this order providing four phase-shifted signals, each of which is angularly "offset" by 90° from another. These four-phase signals are given to four wires 4a–4d respectively. When this is done, at one pair of alternate wires 4a and 4c, variable magnetic fields opposite in phase to each other (each corresponding to the "second" variable magnetic field in the aforementioned embodiment) are created therearound. When the loop conductor 8's two receive conductors 8a, 8d are present immediately beneath such magnetic fields, corresponding antiphase currents are induced which are opposite in phase to each other. These induced currents are of the same direction within the conductive loop 8, and also act to flow into the transmit conductor 8a producing a variable magnetic field (corresponding to the "first" variable magnetic field in the prior embodiment) at here. The same goes with the wires 4b, 4d. Then, the variable magnetic field of transmit conductor 8a in turn permits generation of an induced current in the wire 3, which will become a detection output.

In other words a difference of this embodiment merely lies in that the electromagnetic coupling activity herein becomes reversal in order of sequence, which has been explained in FIG. 2 as follows: the drive current 11→variable magnetic field 12→induced current 13→variable magnetic fields 14a, 14b →induced current (detection current) 15a, 15b. This lets the wire 3 be responsive to a presently detected displacement x for providing a signal output as given by sin(ωt+kx). This output is then passed to a phase difference detector circuit 104 for detection of its phase difference from the AC signal sin(ωt), thereby enabling numerical determination of a displacement required.

There are shown in FIGS. 11A–11D other exemplary structures of the scale 2 that couples electromagnetically with the sensor 1. With a structure of scale 2 shown in FIG. 11A, each loop conductor 8 is formed to have an ellipse-like (or circle-like) loop pattern as a whole with its transmit and receive conductor segments being of the arc shape. With such ellipse-patterned loop conductors, if the drive wire 3 and detector wires 4 mounted on the sensor 1 are designed having the linear shape as in the embodiment discussed previously, then the resultant area or coverage as magnetically coupled with them becomes smaller than would be in the prior embodiment; fortunately, such reduction of magnetic couplement is avoidable by employing the coils shown in FIG. 3 as the drive wire 3 and detector wires 4 with the number of wire turns increased appropriately, which permits achievement of the required electromagnetic coupling that is sufficiently significant for practical implementations.

Figure 11A:
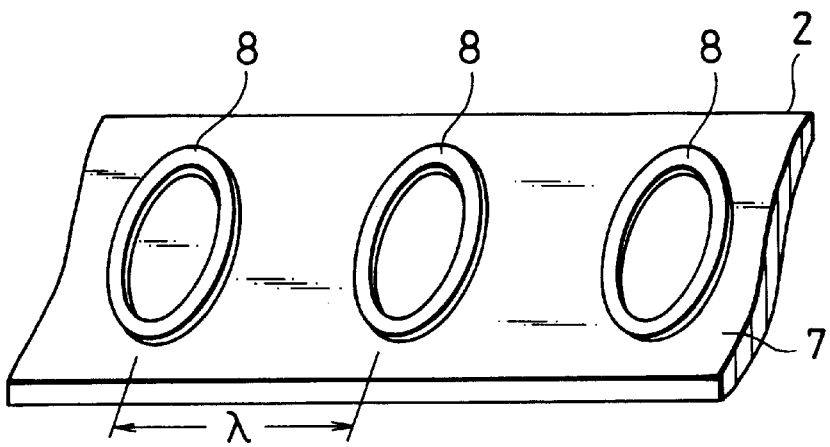
FIGS. 11A to 11D are diagrams each showing an exemplary structure of the scale shown in FIG. 1.
Figure 11B:
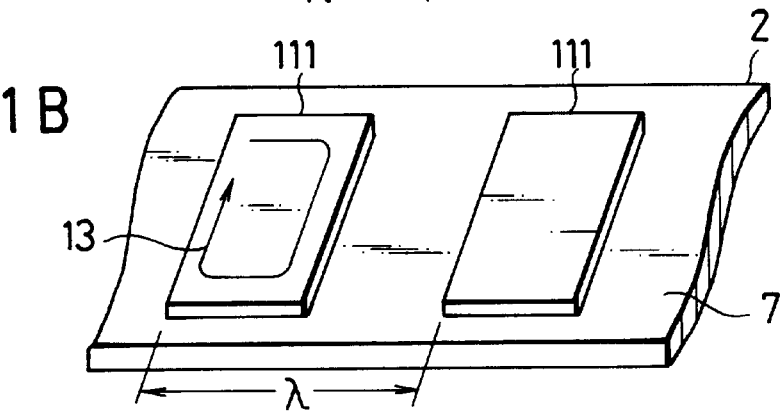

A structure of scale 2 shown in FIG. 11B is such that it employs as the electromagnetic couplers an array of rectangular conductive "island" patterns 111, each being substantially the same in area to the individual loop conductor 8 typically illustrated in FIG. 1. With such rectangular "solid" islands 111, the magnetic coupling activities similar to those in the embodiment stated supra may also be attainable because an induced current 13 behaves to flow as "eddy" current in a loop path indicated by arrow in FIG. 11B, as in the prior embodiments.

Figure 11C:
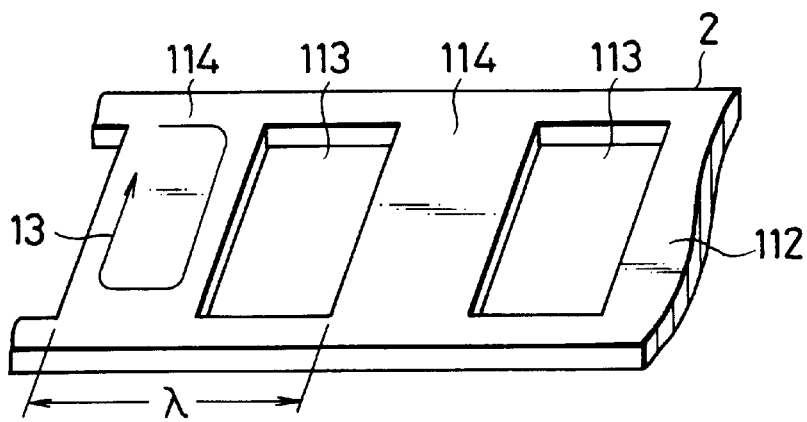

A scale plate 2 shown in FIG. 11C is structured from a tape-like conductive substrate 112 made of copper or the like having an array of multiple rectangular openings or windows 113 along its measurement axis at equal intervals, which are formed by known machining processes such as for example punching techniques. Use of such "ladder"-shaped scale structure results in accomplishment of functionally equivalent conductive patterns 114 each of which is between adjacent ones of the window openings 111 in substrate 112, and thus offers substantially the sam functionality as the conductive islands patterns 111 of FIG. 11B.

Figure 11D:
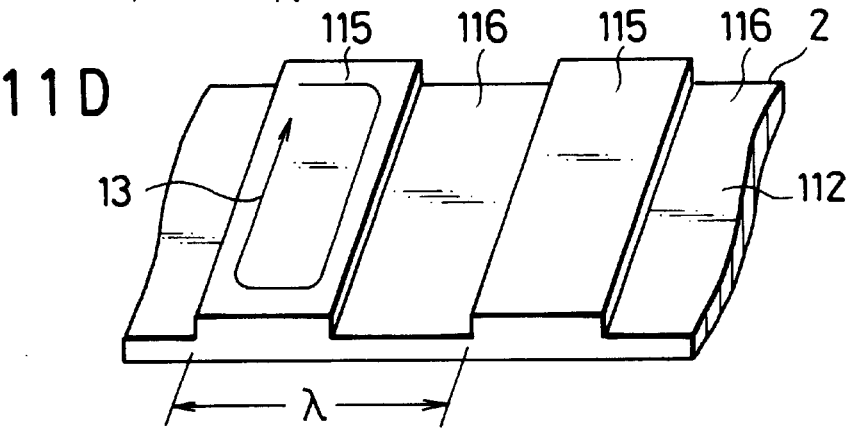

A scale 2 shown in FIG. 11D is such that its tape-like conductive substrate 112 comes with a unique surface configuration on the top thereof, wherein rectangular raised portions 115 and recess portions 116 are laid out alternately along the measurement axis of scale 2. Such "serpentine" surface configuration may be fabricated by currently available mechanical or chemical machining process technologies including but not limited to carving, engraving or sculpture techniques. The raised or protuberance portions 115 are expected to be the same in function as the rectangular islands 111 of FIG. 11B. The maining, recess portions 116 will hardly be contributed to electromagnetic coupling activities due to the fact that these are significant in distance or gap between themselves and the sensor 1 operatively associated therewith.

Note that the conductive islands 111 of FIG. 11B may be magnetic patterns made of ferromagnetic metals by way of example. Similarly, for the scale structures of FIGS. 11C–11D, the conductive substrate 112 may be replaced with a magnetic substrate when necessary. In such cases, the magnetic coupling in the order of the sensor 1→scale 2→sensor 1 is established in a way as follows: while the induced current 113 hardly flows therein, the use of ferromagnetic metals with increased magnetic flux permeability causes the magnetic flux of a variable magnetic field created from a drive coil to periodically receive modulation due to the periodical layout of ferromagnetic metal patterns, which may be sensed by associative detector coils used.

Figure 12:
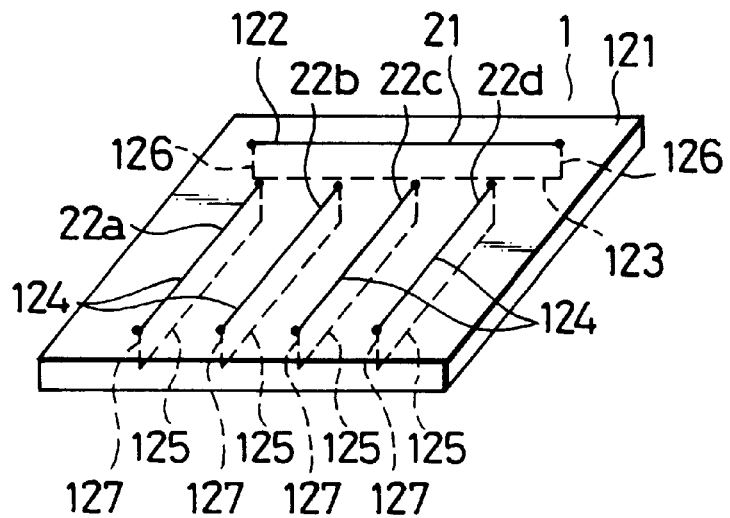
FIG. 12 depicts another exemplary structure of the sensor of FIG. 1.

Another exemplary structure of the sensor 1 is depicted in FIG. 12. Whereas in FIGS. 3–4 the sensor 1 is formed by winding a wire around the resin block 20, the sensor of FIG. 12 is designed including a double-face printed circuit board 121. The print board 121 has its opposite metal films which are patterned so that the upper and lower (top and bottom) lead patterns (122, 123; 124, 125) are formed on the top and bottom board surfaces overlying each other with a dielectric layer sandwiched therebetween. The upper and lower leads 122, 123 forming a pair are electrically connected together via vertical through-going interconnect leads 126 at the terminate ends thereof, thus providing a vertically oriented loop that corresponds to the drive coil 21 of FIG. 3. Similarly, each of four parallel lead pairs extending at right angles to the looped lead pair 122, 123 consists of an upper lead 124 and lower lead 127 which are likewise electrically connected together via vertical through-going leads 127 at the opposite ends of such lead pair, which is thus equivalent in function to the detector coil 22 shown in FIG. 3 or better depicted in FIG. 4A.

With such an arrangement, it becomes possible to allow the sensor 1 to have an "integrated" structure smaller in size with reduced thickness without use of any "discrete" electrical parts or components, such as separate coil wires. The scale 2 may also be structured by use of the scheme as discussed in conjunction with FIG. 3. Employing these fabrication schemes in combination makes it possible to manufacture a highly integrated encoder structure with its scale pitch minimized at enhanced accuracy and reliability.

Figure 13A:
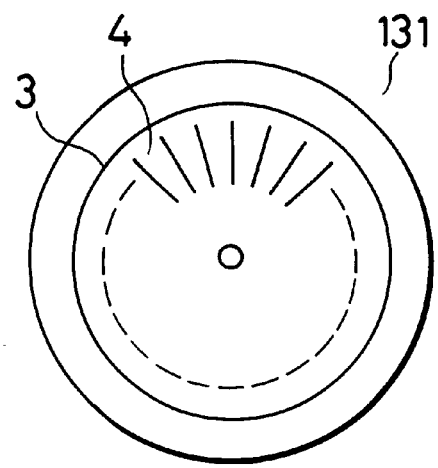
FIGS. 13A and 13B are diagrams showing an embodiment of the invention adapted for use with a rotary encoder.
Figure 13B:
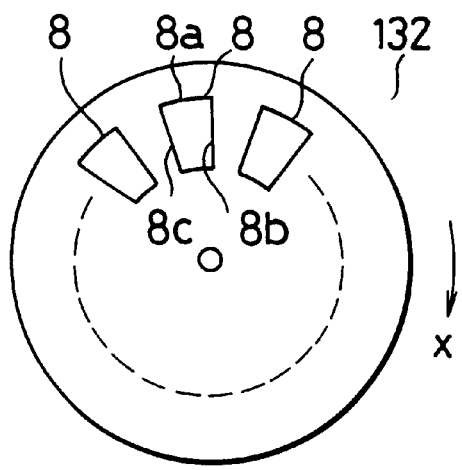

Optionally, the printed circuit board 121 of FIG. 12 may alternatively be a glass substrate, ceramic substrate, or other suitable similar substrates if needed Turning now to FIGS. 13A–13B, there are illustrated in schematic plan view a stator 131 and rotor 132 of a rotary encoder incorporating the principles of the invention. As shown, the stator 131 which may correspond to the sensor 1 discussed above includes a round disk-like plate having one surface opposing the rotor 132, on which surface a ring-like drive wire 3 and multiple detection wires 4 are formed. The driver ring 3 circumferentially extends along the outer periphery of the disk. The detector wires 4 extend radially within driver ring 3 on the disk surface at equal angular pitches $\lambda/4$. Four successive ones of detector wires 4 are organized into a group or "set." Stator 131 of FIG. 13A is immovably placed opposing the rotor 132 shown in FIG. 13B with a predefined thin space or gap kept therebetween. Rotor 132 may be a similar round disk-like plate having a surface opposing stator 131, on which surface a circular array of equally spaced-apart sector-like conductive loops 8 are laid out at angular pitch $\lambda$ so that each loop 8 is electromagnetically coupled with a corresponding set of four detector wires 4 and its associated part of driver ring 4 on stator 131. As in the prior embodiments, the individual loop conductor 8 has a receive conductor segment $8a$ opposing driver ring 3, and transmit conductor segments $8b$, $8c$ facing corresponding ones of detector wires 4 on stator 131.

With such a sensor structure, the same principles of operation as in the prior embodiments are employable for measurement of rotational angular displacement x.

The foregoing sensor/scale structures embodying the invention may offer several advantages which follow.

(1) Principally, no direct electromagnetic coupling activities are found between the driver wire 3 and detector wires 4 in the absence of the scale 2 due to the fact that driver wire 3 and each detector wire 4 are laid out at right angles to each other. Accordingly, unlike prior known schemes, any attendant crosstalk hardly occurs letting no offset components be contained in output signals.

(2) The electromagnetic coupling along the "route" of the driver wire and scale plus detector wires in this order is increasable in magnitude by arranging the scale 2 so that it has thereon its receive conductor $8a$ magnetically coupled to drive wire 3 with the rectangular or similarly shaped loop conductors (closed-loop coil) 8 having transmit conductor segments $8b$, $8c$ coupled with such detector wires 4.

(3) The sensor 1 and its associative scale 2 may be designed as separate or "discrete" electrical components by mounting or "integrating" the drive wire 3 and detector wires 4 together on the sensor 1 while providing the loop conductors 8 on the scale 2. In addition, the sensor 1 alone requires extra electrical lead wiring for transmission of input/output signals, which may in turn facilitate electrical interconnections required.

(4) Use of multiple sets of detector wires 4 may enable position measurement with further enhanced accuracy due to resultant averaging effect among them.

(5) The sensor 1 and scale 2 may be structured employing printed circuit boards, glass substrates, ceramic substrates or any equivalents thereto with more than one metallic film formed thereon, which offers enhanced ability to form by etching treatments any desired electrical lead patterns including the drive wire 3 and detector wires 4 as well as loop conductors 8. This in turn makes it possible to fabricate high-accuracy encoders while reducing complexities in the manufacture thereof.

The foregoing embodiment structures are aimed at achievement of high accuracy of measurement due to the averaging effect, which is obtainable by disposing the sensor 1's detector wires 4 (or detector coils 22) so that these are 90° phase-shifted from each other with four wires or coils as a unit for addition of negative-phase or antiphase output signals together. This scheme also offers secondary harmonic distortion reducibilities, and moreover enables establishment of further improved low-distortion characteristics. One exemplary configuration of a sensor 1 employing this low-distortion attaining scheme will be explained below with reference to FIGS. 14–16.

See first FIG. 14A. This diagram depicts one layout example of first detection wires 41 with a phase difference of λ/4 (=90°) between adjacent ones of them. Four ones 4a1, 4b1, 4c1, 4d1 of these detector wires are organized into a group or "set." See FIG. 14B, which illustrates an exemplary layout of second detector wires 42 (4a2, 4b2, 4c2, 4d2) with a phase offset of λ/6 (=60°) relative to the configuration of FIG. 14A. The individual one of such wires may be the same in function as a corresponding one of the wires in the embodiments stated supra The wire layout patterns of FIGS. 14A–14B are combined together obtaining a composite wire layout shown in FIG. 14C. More specifically, the first detector wires 41 and the second ones 42 are disposed formulating into a single overlap pattern with the latter wires being phase-shifted by 60° from the former. The "pattern-synthesized" first and second detector wires 41, 42 are within a spatial coverage equivalent in dimension to the length of the driver wire 3.

Referring to FIG. 15, there is shown one exemplary wire configuration in the case the first and second detector wires 41, 42 of FIG. 14C are designed so that each constitutes a detection coil. Appropriate interconnections are made so that respective outputs of A-phases (A1, A2) of the fist and second detector wires 41, 42 are added together whereas the remaining antiphase outputs of AB-phases (AB1, AB2) opposite in phase to each other undergo subtraction therebetween. The same goes with B-phases (B1, B2) and BB-phases (BB1, BB2) being exactly out of phase therewith. Subtracting an AB-phase output from A-phase output may correspond to the differentiation processing as effected at the differential amplifiers 5a, 5b discussed previously in conjunction with FIG. 1. Whereby, both the offset reducibility due to the averaging effect and the secondary harmonic distortion suppressibility are obtainable at a time. Adding together A-phase (A1, A2) outputs with a 60° phase shift therebetween and addition of AB-phase (AB1, AB2) outputs result in a decrease in tertiary harmonic distortion (more generically, odd-number ordered harmonic distortion). The same is true for B and BB phases.

Figure 16:
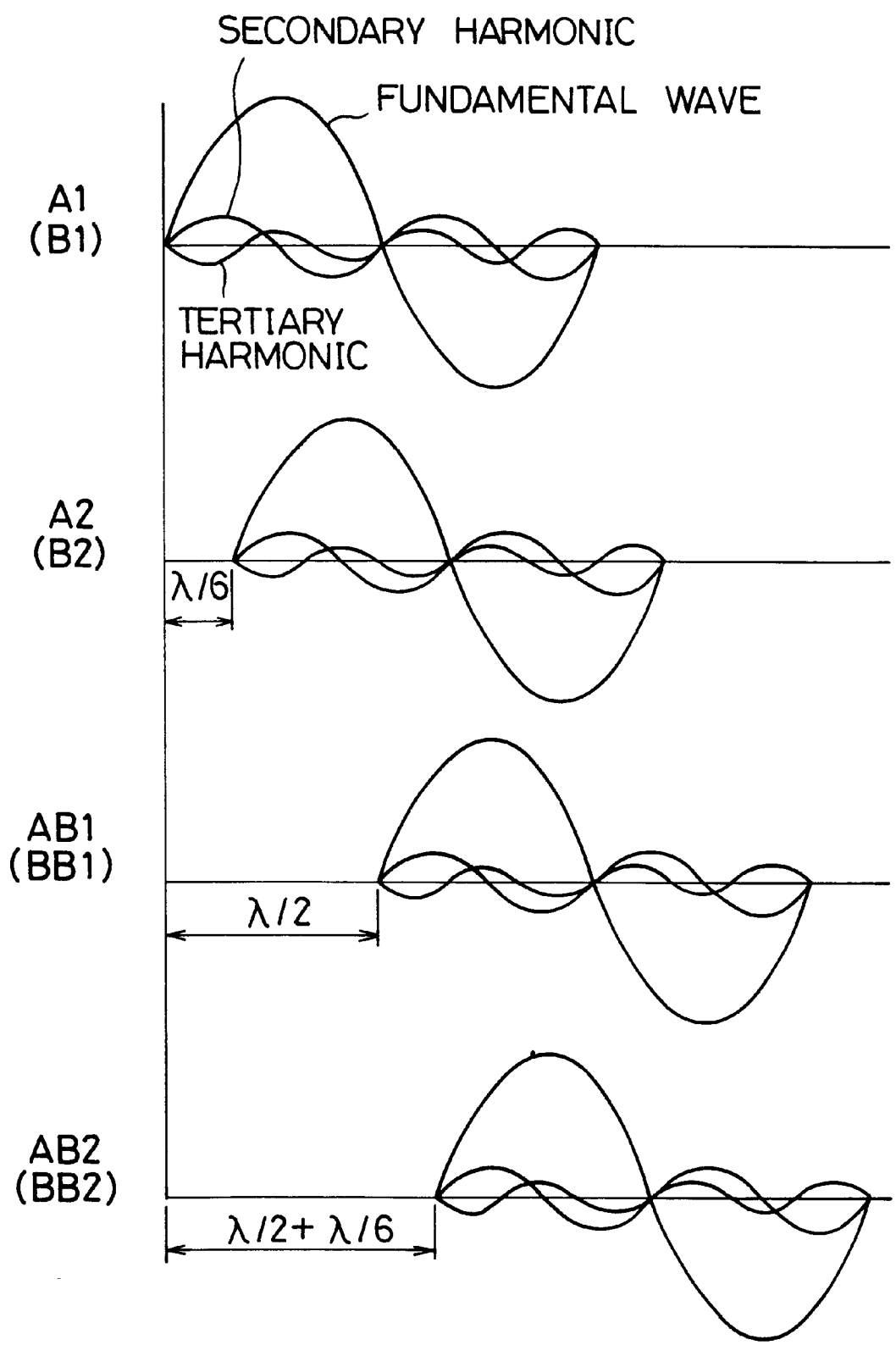
FIG. 16 a waveform diagram showing a way of reducing harmonic wave distortion in the embodiment sensor.

FIG. 16 shows conceptually a way of reducing harmonic distortion in accordance with this embodiment. As shown herein, four different phase-shifted output waveforms are such that with respect to an A1-phase output depicted on the top, an A2-phase output is phase-shifted by 60°; similarly, an AB2-phase output shown on the bottom in FIG. 16 is 60° phase-shifted from an AB1-phase output By adding together the waveforms of A1- and A2-phase outputs, tertiary harmonic distortion components are cancelled out; likewise, adding together AB1- and AB2-phase outputs results in cancellation of tertiary harmonic distortion components. Furthermore, subtracting from the A1-phase output the AB1-phase output-this is exactly out of phase with the former—while subtracting from A2-phase output the AB2-phase output which is exactly out of phase therewith may enable cancellation of secondary harmonic distortion components. The same goes with the B- and BB-phase outputs.

Figure 17A:
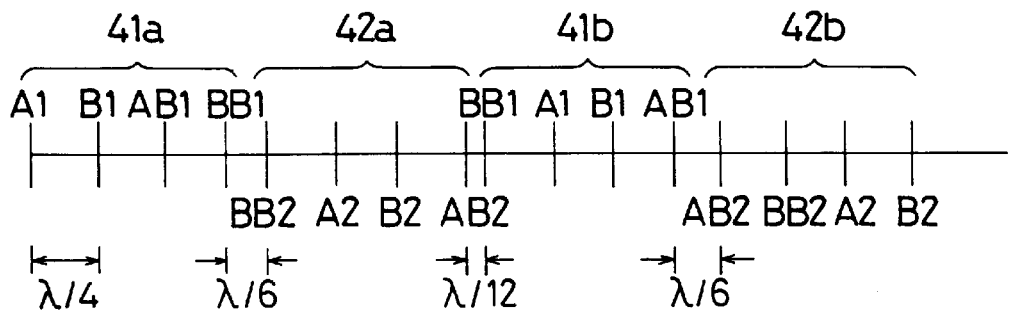
FIGS. 17A–17C are illustrations each showing a modified sensor configuration of the embodiment sensor.
Figure 17B:
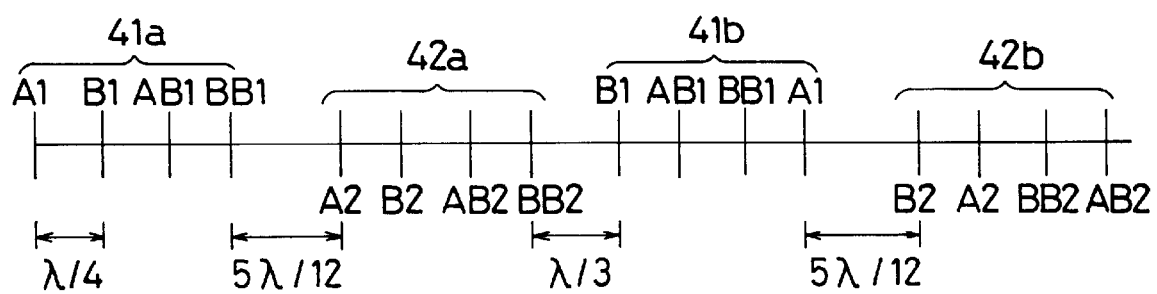
Figure 17C:
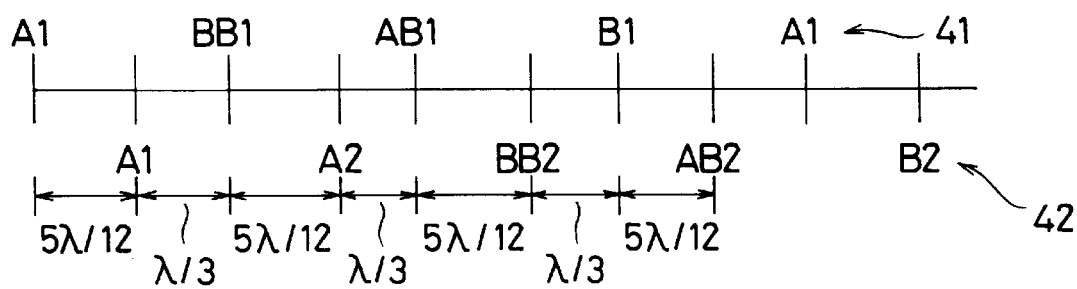

FIGS. 17A–17C show some modifications of the layout of the detector wires 41, 42 shown in FIGS. 14–15. In FIG. 17A the first detector wires 41 include a first set 41a and second set 41b, which are arranged so that the A-phase wires, i.e. A1- and AB1-phase wires, are exactly in phase with each other in the sets 41a and 41b, whereas B-phase wires (B1- and BB1-phase ones) have the reverse phase with each other in the sets 41a and 41b. The second detector wires 42 include a first set 42a and a second set 42b, which are disposed so that these are 60° phase-shifted from the wire sets 41a, 41b of first detector wires 41. In this case, A-phase outputs are taken out after being added together, while B-phase outputs are taken after being subject to subtraction therebetween.

A detector wire configuration of FIG. 17B may be similar to that shown in FIG. 17A with the wire sets 41a, 42a, 41b, 42b being disposed at increased intervals or pitches. More specifically, the distance between neighboring wire sets 41a, 42a is increased from λ/6(FIG. 17A) up to 5λ/12. The distance between the next neighboring sets 42a, 41b is increased from λ/12 to λ/3. The distance between sets 41b, 42b is increased to 5λ/12 from λ/6. A wire layout pattern of FIG. 17C is such that while four phase ones A1, BB1, AB1, B1 of the first detector wires 41 are disposed at intervals of 270', the second detector wires 42 containing four phase ones B2, A2, BB2, AB2—each is 60° -shifted in phase from another—are laid out so that each is between adjacent ones of second wires 41.

Any one of the detector wire layout patterns shown in FIGS. 17A–17C is similar to the prior discussed embodiments in that the plural sets of first detector wires 41 are disposed so that these are the same in phase with respect to at least one of A- and B-phases while at the same causing the second detector wires 42 to be disposed in the state of 60° phase-shift relative to such first wires 41.

With the layout patterns of FIGS. 17A–17C also, it is possible to obtain the intended output signals with harmonic distortion greatly suppressed or minimized.

Although the foregoing description is drawn to removal of tertiary harmonic distortion, the phase difference between the first and second detector wires should not exclusively be limited to the angle value 60° (λ/6), such value may generically be set at λ/2N (where N is an odd number greater than or equal to 3). With such value settings, it is possible to remove N-order harmonic distortion.

FIG. 18 illustrates a principal structure of an induction-type position sensor 140 in accordance with the second aspect of the instant invention. The inductive position sensor 140 shown is structured including a drive coil 141 as its primary coil, and a detector coil 142 as the secondary coil. These coils 141, 142 have their axes a, b at right angles to each other with a single center point owned in common. Drive coil 141 is electrically connected to an AC signal source 143, which is operable as a magnetization exciter or magnetizer for coil 141. Detector coil 142 is connected to a detector circuit 144. Drive coil 141 and detector coil 142 are immovably supported and adherently secured to a support structure (not shown). When an object to be measured (i.e., a target body) is absent as in the state depicted in FIG. 18, variable magnetic flux lines created during AC-driving of drive coil 141 hardly interlink detector coil 142 as shown in FIG. 19A, resulting in provision of no detection outputs at detector coil 142. This is reworded such that in the absence of a target body, no electromagnetic coupling activities are found between drive coil 141 and detector coil 142.

On the contrary, suppose that a magnetic body (or conductor) 145 which is the target body being measured approaches the cross-coupled coils 141, 142 along a bisector line c of the axes a, b thereof as shown exemplary in FIG. 19B. Variable magnetic flux, i.e. magnetic lines of force, from the drive coil 141 is modulated behaving to partly cross or interlink detector coil 142. This allows coil 142 to derive a corresponding detection output. The foregoing is the principle of position measurement, which is employable for implementation of proximity sensors and linear encoders as will be described later.

Figure 20:
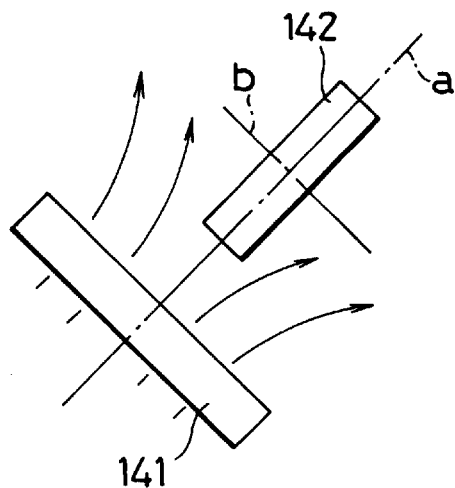
FIGS. 20, 21, 22 and 23 are diagrams each showing a configuration of an induction-type position sensor also incorporating the principles of the invention.
Figure 21:
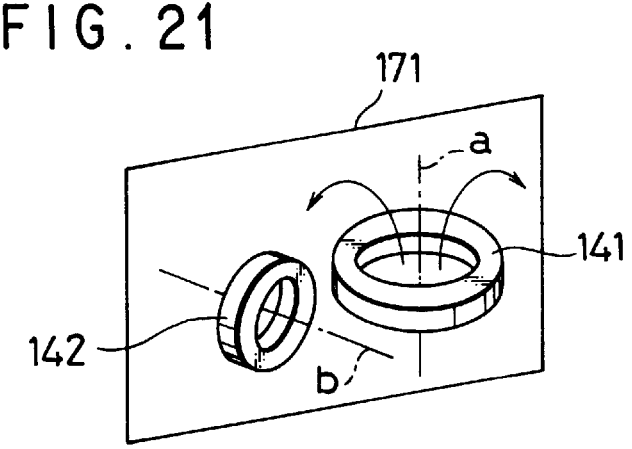
Figure 22:
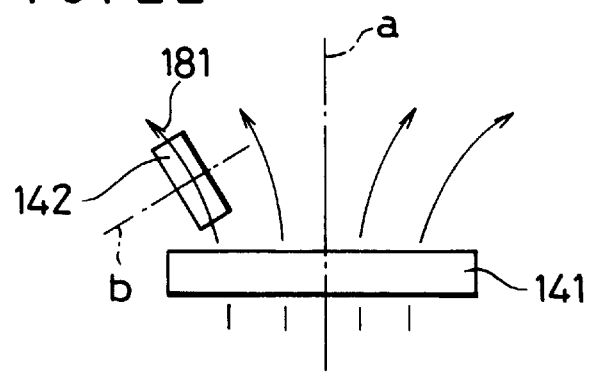

The sensor structure of FIG. 18 is modifiable in several ways as shown in FIGS. 20–22. See first FIG. 20. A sensor structure shown herein includes its drive coil 141 and detector coil 142. While the center points of these coils are far from each other, these yet maintain the relationship that the axis a of drive coil 141 is at 90° to the axis b of detector coil 142. As long as this relation is satisfied, no electromagnetic coupling is between drive coil 141 and detector coil 142 in the absence of any target body to be measured, thereby enabling effectuation of offset-free position measurements based on the same principle as in the case of FIG. 18.

A sensor structure of FIG. 21 is such that its detector coil 142 is disposed not simply on the axis a of driver coil 141; rather, coil 142 neighbors upon drive coil 141 in a plane 171 containing therein the axis a of coil 141, and has its own axis b perpendicular to plane 171. In this case also, variable magnetic flux from drive coil 141 will no longer be coupled with detector coil 142 in the absence of a target body being measured: only when such target body appears, variable magnetic flux is modulated permitting couplement with detector coil 142.

A sensor structure of FIG. 22 is designed including a detector coil 142 disposed to have its axis b extending at 90° to a specific one 181 of magnetic flux lines produced from a driver coil 141 in the absence of a to-be-measured object, which one is in a predefined direction. In this case also, the magnetic flux from drive coil 141 is modulated by the object under measurement permitting obtainability of a detection output due to electromagnetic coupling with detector coil 142 in such event only.

Figure 23:
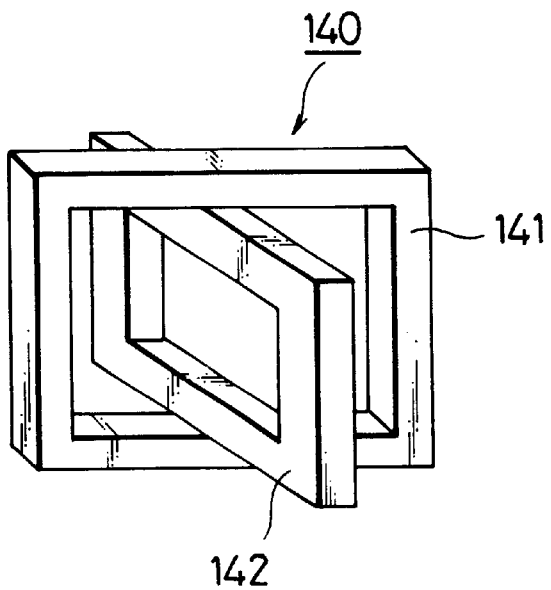

In the sensor structures discussed above, both the drive coil 141 and detector coil 142 are designed into the circular or ring-like shape, which may alternatively be modified so that these coils are rectangular in shape as shown in FIG. 23.

Figure 24:
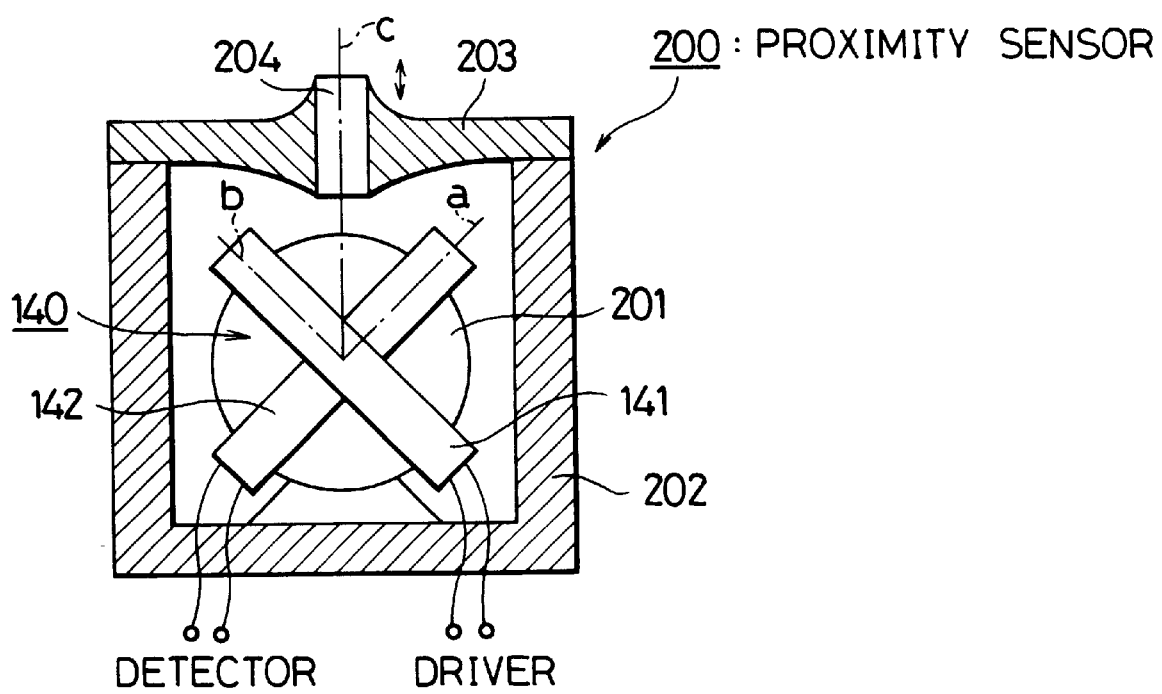
FIG. 24 illustrates, in cross-section, a proximity sensor module employing the position sensor of FIG. 18 in accordance with a further embodiment of the invention.

A further embodiment is shown in FIG. 24, wherein the position sensor 140 of FIG. 18 is adapted for use with a proximity sensor 200. This proximity sensor 200 includes a drive coil 141 and a detector coil 142 operatively associated therewith. These coils are mounted to a support structure 201, which in turn is immovably received within a housing 202. Housing 202 has an elastic top cover plate member 203 that has a vertical though-hole as centrally defined therein, into which a contactor (or a touch probe) 204 is inserted and attached as an object under measurement in such a manner as to lie along a bisector line as defined by equally dividing an angle between the axis a of drive coil 141 and the detector coil 142's axis b. Contactor 204 may be a magnetic or conductive material.

Unless the contactor 204 is in contact with a target object being measured (not shown), this contactor is kept spaced apart by a specified distance from both the drive coil 141 and detector coil 142 so that those components of the variable magnetic field from drive coil 141 intersecting detector coil 142 stay negligible in magnitude. This is a steady or standby state. When contactor 204 comes into contact at its distal end with the target object, the elastic plate 203 behaves to likewise bend downwardly. The variable magnetic flux of drive coil 141 is thus modulated causing its interlinkage components with detector coil 142 to increase accordingly. Thus, such physical contact can be detected by determining a detection output of coil 142 through comparison with a preset threshold value as a reference level therefor, by way of example.

Figure 25:
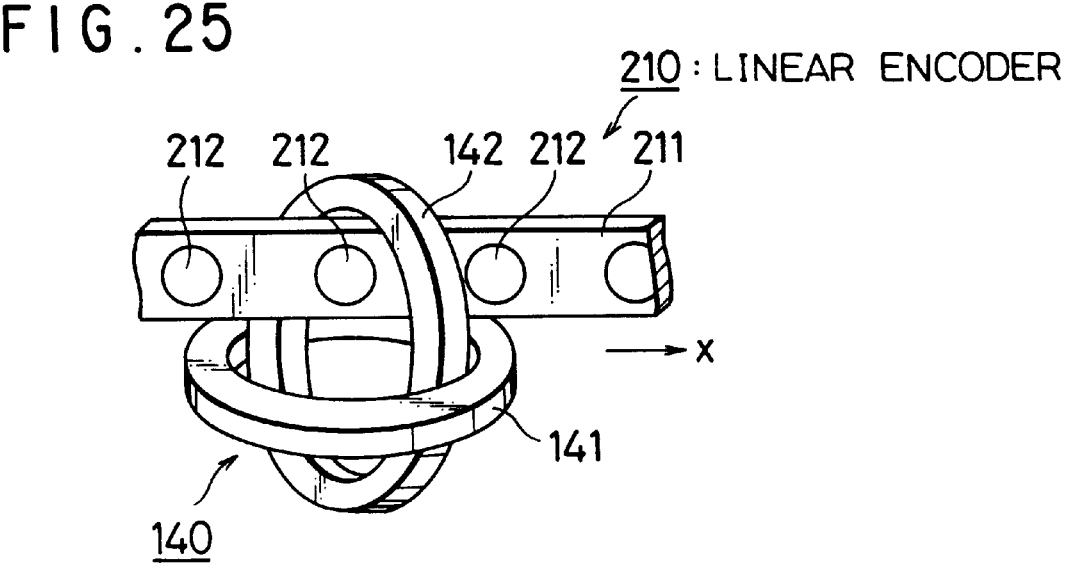
FIG. 25 illustrates in perspective view a linear encoder structure employing the FIG. 18 sensor in accordance with a still further embodiment of the invention.

A linear encoder device 210 also embodying the invention is shown in FIG. 25, which employs the electromagnetic position sensor 140 of FIG. 18 therein The linear encoder 210 is held by a support structure (not shown). Encoder 210 also includes a scale plate 211 operatively associated with position sensor 140 formed from its ring-like drive coil 141 and detector coil 142. These coil rings 141, 142 are spatially engaged in a way such that coil 142 is inside of coil 141 with their axes at 90° to each other. For such cross-coupled coils 141, 142, the scale 2 is mounted as an object to be measured to laterally extend through the upstanding coil 142 and is relatively movable in a direction indicated by arrow x in FIG. 25, which direction is parallel to the axis of detector coil 142. Scale 211 has thereon an array of periodically disposed coin-shaped conductors 212 for modulation of variable magnetic flux from drive coil 141. These conductors 212 may optionally be magnetic materials.

In the linear encoder 210 of FIG. 25, as the scale 211 exhibits relative movement, the variable magnetic flux from drive coil 141 is modulated periodically due to the periodic layout of equally spaced conductive (or magnetic) round islands 212 on scale 211 thus letting detector coil 142 derive detection outputs periodically.

Figure 26A:
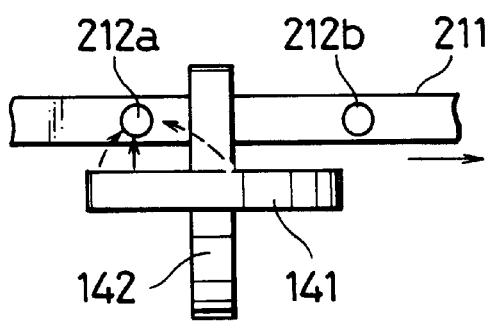
FIGS. 26A–26C are diagrams for explanation of an operation of the linear encoder of FIG. 25.
Figure 26B:
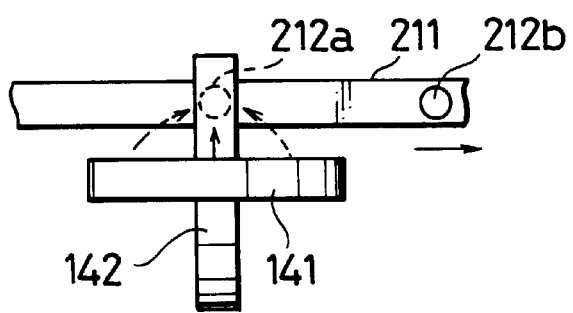
Figure 26C:
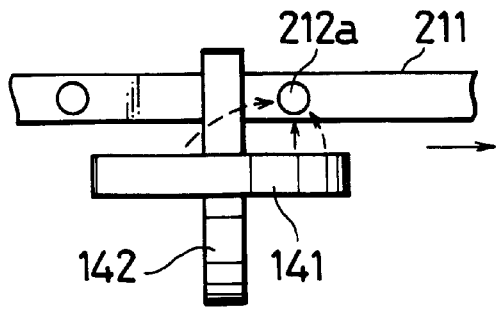

See FIGS. 26A–26C, which illustrate in side view some of the major steps during linear movement of the scale 211 relative to the stationary cross-coupled drive coil 141 and detector coil 142, each step corresponding to one state of coupling of magnetic flux from coil 141 with respect to coil 142 at an instant. In this drawing two adjacent conductor islands 212a, 212b are considered while scale 211 is moving in the rightward direction. In the state of FIG. 26A, conductor 212b has almost completely escaped from the magnetic flux region of drive coil 141 whereas the next conductor 212a is approaching detector coil 142. At this time certain components of variable magnetic flux from drive coil 141 are attracted to conductor 212a as indicated by dotted lines in FIG. 26A. In other words, part of the magnetic flux from drive coil 141 comes to couple or interlink detector coil 142. Scale 211 is keep moving rightwardly. When conductor 212a enter inside of the core of detector coil 142 as shown in FIG. 26B, magnetic flux from drive coil 141 is modulated uniformly with respect to the right and left sides thereof to ensure that no magnetic flux lines cross detector coil 142. As scale 2 further moves rightward, the magnetic flux lines from drive coil 141 are attracted to meet together at conductor 212a only, resulting in creation of magnetic flux crossing detector coil 142 in a direction opposite to that in FIG. 26A.

Accordingly, during linear movement of the scale 2 through the steps shown in FIGS. 26A–26C, the detector coil 142 provides different outputs in polarity at different stages, including a positive (or negative) polarity output, zero output, and then negative (or positive) polarity output in this order of sequence. With such operation, a sinusoidal wave signal is obtainable at detector coil 142 as the scale 2 moves linearly. Counting the cycle or period of this sine wave signal may result in accurate detection of displacement concerned.

It has been described that the inductive position measurement apparatus of the first type incorporating the principles of this invention includes its drive wire and detection wires as disposed at right angles to each other to ensure that any variable magnetic fields creatable by AC driving of the drive coil are no longer directly coupled with the detection wire in any events. The first variable magnetic field generatable through AC driving of the drive wire in turn allows the electromagnetic couplers to produce an induced current, which in turn permits creation of the second variable magnetic field which is at 90° to the first magnetic field. Detecting the second variable magnetic field using the detection wires results in provision of a detection output which is variable depending upon relative displacement between the first and second members. With this scheme of this invention, no electromagnetic coupling activities are present between the drive wire and detection wire in principle; thus, no offset components are generated unlike prior art schemes. This in turn makes it possible to achieve high-accuracy position measurements.

In accordance with the inductive position measurement apparatus of the second type also incorporating the principles of the invention, the drive coil and detector coil of a position sensor are specifically arranged in layout so that these are free from electromagnetic coupling activities in the absence of a target object to be measured, whereby the drive coil's generated variable magnetic field is modulated in distribution in a way responding to displacement of the target body resulting in creation of electromagnetic coupling with the detector coil. This apparatus is also capable of obtaining the intended detection output free from any offset components, thus enabling accomplishment of position measurements with increased accuracy and enhanced reliability.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope of coverage only as specified in the appended claims.

The entire disclosure of Japanese Patent Applications No. 9-333249 filed on Dec. 3, 1997 and No. 10-143537 filed on May 25, 1998, including specification, claims, drawings and abstract are incorporated herein by reference in its entirety.

What is claimed is:

1. An induction-type position measuring apparatus comprising:
   a first member;
   a second member having a measurement axis and being movably arranged along the measurement axis with a predefined gap between the first and second members;
   a drive wire disposed on the first member the drive wire producing a first variable magnetic field in response to an alternating current from a drive signal source;
   an array of electromagnetic coupling devices laid out on the second member along the measurement axis at constant intervals, each of the electromagnetic coupling devices generating an induced current due to coupling with the first variable magnetic field generated by the drive wire, and generating a second variable magnetic field substantially perpendicular to the first variable magnetic field in response to the induced current at a position physically spaced apart from a coupling portion with the first variable magnetic field; and
   a variable magnetic field detecting portion having at least one detection wire, wherein each detection wire does not form closed loops parallel to the surface of the first member and is disposed on the first member substantially perpendicular to the drive wire, the variable magnetic field detecting portion providing at least one output signal due to coupling with the second variable magnetic field from the electromagnetic coupling devices, each at least one output signal with relative displacement of the first and second members.

2. The apparatus according to claim 1, wherein:
   the drive wire is wound into a drive coil defining a first plane; and
   each of the at least one detection wire is wound into a detector coil defining a second plane, the first and second planes being substantially perpendicular to each other.

3. The apparatus according to claim 1, wherein the first member includes an insulative block, the drive wire wound around the insulative block into a drive coil and the detector wire wound around the insulative block into a detector coil.

4. The apparatus according to claim 1, wherein the first member comprises:
   an insulating substrate having a top and a bottom surface, at least one of the drive wire and the detector wire are formed of at least one set of patterned conductive leads on the top and bottom surfaces of the insulating substrate and
   at least one set of conductive through-going leads extending through the substrate to electrically connect the patterned conductive leads to form at least one of a drive coil and a detector coil, respectively, an axis of the drive coil being substantially perpendicular to an axis of the detector coil.

5. The apparatus according to claim 1, wherein each of the electromagnetic coupling device comprises a conductive closed loop pattern having a receiver conductor segment lying substantially parallel to the drive wire for being coupled with the first variable magnetic field as generated by the drive wire, and a transmit conductor segment integral with the receiver conductor for creation of the second magnetic field.

6. The apparatus according to claim 5, wherein the conductive closed loop pattern is of a rectangular shape with the receiver conductor segment lying at right angles to the transmit conductor segment.

7. The apparatus according to claim 5, wherein the conductive closed loop pattern is shaped letting each of the receiver conductor segment and the transmit conductor segment resemble a circular arc in shape.

8. The apparatus according to claim 5, wherein each the conductive closed loop pattern includes two spaced-apart receiver conductor segments with a distance equivalent to half of a layout period of the electromagnetic coupling devices for permitting flow of induced currents in opposite directions at right angles to the drive wire, and wherein the variable magnetic field detector device includes at least one set of four detection wires in combination, the wires being laid out in a range corresponding to the length of the drive wire at specified intervals each being quarter of the layout period of the electromagnetic coupling devices for coupling with a variable magnetic field created from the transmit conductor segment of each the conductive closed loop pattern to thereby provide four-phase output signals each being shifted of 90° from another.

9. The apparatus according to claim 5, wherein each the conductive closed loop pattern includes two spaced-apart transmit conductor segments at intervals each equal to half of a layout period of said electromagnetic coupling devices for permitting flow of induced currents in opposite directions at right angles to the drive wire, and wherein the variable magnetic field detector devices includes at least one set of four first detection wires in combination being laid out in a range corresponding to the length of the drive wire at specified intervals each being quarter of the layout period of the electromagnetic coupling devices for coupling with a variable magnetic field from the transmit conductor segment of each the conductive closed loop pattern to thereby provide four-phase output signals each being shifted of 90° from another, at least one set of four second detection wires as disposed within a range of the length of the drive wire at intervals each equal to a quarter of the layout period of the electromagnetic coupling devices with a predefined phase shift relative to the first detection wires for coupling with variable magnetic fields from the transtmit conductor segments of each the conductive closed loop pattern to thereby provide four-phase output signals each being shifted of 90° from another, the predefined phase shift being substantially equal to $\lambda/2N$, where $\lambda$ is the layout period of the electromagnetic coupling devices, and N is an odd number greater than or equal to 3.

10. The apparatus according to claim 1, wherein each the electromagnetic coupling device is formed of a conductive pattern responsive to receipt of the first variable magnetic field from the drive wire for permitting induction of an eddy current therein.

11. The apparatus according to claim 1, wherein each the electromagnetic coupling device is formed of a magnetic material pattern for modulating a magnetic flux density of the first variable magnetic field generated from the drive wire.

12. A induction-type position measuring apparatus comprising:

a first member;

a second member having a measurement axis and being movably arranged along the measurement axis with a predefined gap between the first and second members;

a drive wire disposed on the first member, the drive wire producing a first variable magnetic field in response to an alternating current from a drive signal source;

an array of electromagnetic coupling devices laid out on the second member along the measurement axis at constant intervals, a first current being induced in each of the electromagnetic coupling devices in response to the first variable magnetic field generated by the drive wire, a second variable magnetic field being induced about each of the electromagnetic coupling devices in response to the in duced first current; and a variable magnetic field detecting portion having at least one detection wire, a second current being induced in each of the at least one detection wire in response to the second variable magnetic fields generated by the array of electromagnetic coupling devices, each at least one detection wire being disposed on the first member substantially perpendicular to the drive wire, the variable magnetic field detecting portion providing at least one output signal in response to the second variable magnetic fields from the electromagnetic coupling devices, the at least one output signal varying with relative displacement of the first and second members;

wherein the drive wire lies in a first plane; and each at least one detection wire lies in a corresponding second plane, the first plane being perpendicular to each second plane.

13. An induction-type position measuring apparatus comprising:

a first member;

a second member having a measurement axis and being movably arranged along the measurement axis with a predefined gap between the first and second members;

a drive wire disposed on the first member, the drive wire producing a first variable magnetic field in response to an alternating current from a drive signal source;

an array of electromagnetic coupling devices laid out on the second member along the measurement axis at constant intervals, a first current being induced in each of the electromagnetic coupling devices in response to the first variable magnetic field generated by the drive wire, a second variable magnetic field being induced about each of the electromagnetic coupling devices in response to the induced first current; and a variable magnetic field detecting portion having at least one detection wire, a second current being induced in each of the at least one detection wire in response to the second variable magnetic fields generated by the array of electromagnetic coupling devices, a third variable magnetic field being induced about each at least one detection wire in response to the induced second current;

wherein magnetic field lines of the first variable magnetic field are perpendicular to magnetic field lines of the third variable magnetic fields.

\* \* \* \* \*